(12) United States Patent
Price

(10) Patent No.: US 8,268,024 B2
(45) Date of Patent: Sep. 18, 2012

(54) PRE-REFORMER WITH EXTENDED SURFACE AND METHOD

(75) Inventor: Arthur Joseph Price, Kingwood, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 290 days.

(21) Appl. No.: 12/774,505

(22) Filed: May 5, 2010

(65) Prior Publication Data

US 2011/0042621 A1 Feb. 24, 2011

Related U.S. Application Data

(60) Provisional application No. 61/235,639, filed on Aug. 20, 2009.

(51) Int. Cl.
*B01J 7/00* (2006.01)
*B01J 8/00* (2006.01)
*C01B 3/36* (2006.01)
*C01B 6/24* (2006.01)
*C01B 3/02* (2006.01)

(52) U.S. Cl. ........... 48/61; 48/197 R; 422/625; 423/644; 423/648.1

(58) Field of Classification Search ...... 48/61; 422/625; 423/644

See application file for complete search history.

(56) References Cited

U.S. PATENT DOCUMENTS

| | | | | |
|---|---|---|---|---|
| 2,625,470 A * | 1/1953 | Roberts, Jr. | ............... | 48/198.1 |
| 4,959,079 A * | 9/1990 | Grotz et al. | ............... | 48/198.7 |
| 5,006,131 A * | 4/1991 | Karafian et al. | ............... | 48/94 |
| 5,181,937 A * | 1/1993 | Karafian et al. | ............... | 48/95 |
| 5,264,202 A * | 11/1993 | Snyder | ............... | 423/653 |
| 5,300,275 A * | 4/1994 | Lywood | ............... | 423/655 |
| 6,818,028 B2 * | 11/2004 | Barnett et al. | ............... | 48/198.7 |
| 7,220,505 B2 | 5/2007 | Malhotra et al. | | |
| 7,435,401 B2 | 10/2008 | Barnett et al. | | |
| 7,988,948 B2 * | 8/2011 | Guvelioglu et al. | ............... | 423/652 |
| 2003/0110693 A1 * | 6/2003 | Drnevich et al. | ............... | 48/197 R |
| 2003/0110694 A1 * | 6/2003 | Drnevich et al. | ............... | 48/198.5 |
| 2009/0077890 A1 * | 3/2009 | Pearson | ............... | 48/127.9 |
| 2009/0104110 A1 * | 4/2009 | Peng et al. | ............... | 423/652 |
| 2010/0264373 A1 * | 10/2010 | Licht et al. | ............... | 252/373 |

* cited by examiner

*Primary Examiner* — Matthew Merkling
(74) *Attorney, Agent, or Firm* — KBR IP Legal Dept.

(57) ABSTRACT

Apparatus, system, and method for producing syngas. The apparatus can include a first reformer, which can include a radiant section having a reformer tube disposed therein. The reformer tube can be at least partially filled with a first catalyst. The first reformer can also include a transition section coupled to the radiant section, a convective section coupled to the transition section, and a plurality of pre-reformer tubes disposed in the transition section. The plurality of pre-reformer tubes can be filled with a second catalyst and fluidly coupled to the reformer tube via a line external to the plurality of pre-reformer tubes. At least one of the plurality of pre-reformer tubes can have at least one extended surface disposed thereon. The second reformer can be coupled to the reformer tube and to an oxidant source. The third reformer can be coupled to the second reformer and to the reformer tube.

20 Claims, 5 Drawing Sheets

1

PRE-REFORMER WITH EXTENDED SURFACE AND METHOD

CROSS-REFERENCE TO RELATED APPLICATIONS

This application claims priority to U.S. Provisional Patent Application having Ser. No. 61/235,639, filed on Aug. 20, 2009, which is incorporated by reference herein.

BACKGROUND OF THE INVENTION

1. Field of the Invention

Embodiments of the present invention generally relate to apparatus, systems, and processes for producing syngas. More particularly, embodiments of the present invention relate to apparatus, systems, and processes for reforming a hydrocarbon in a reforming furnace having pre-reformer tubes disposed in a transition section thereof.

2. Description of the Related Art

Hydrocarbon reforming furnaces are used to convert hydrocarbons such as naphtha and natural gas, among many possibilities, to syngas, which typically contains hydrogen and carbon monoxide. Syngas can also include varying amounts of other materials such as methane, carbon dioxide, nitrogen, and argon. The amount of these other materials depends on the composition of the hydrocarbons introduced to the reforming furnace and the configuration of the reforming furnace itself. The syngas can subsequently be converted into Fischer-Tropsch products, ammonia, and/or other useful products, as is known in the art.

Some hydrocarbon reforming furnaces include a radiant section in which a reformer tube is heated by radiant burners. Hydrocarbon can be fed to the reformer tube, which can be filled with catalyst. The reformer tube is heated by the radiant burners and an endothermic reaction can take place, in which at least a portion of the hydrocarbon stream is converted to carbon monoxide and hydrogen gas in the presence of steam. As the reaction is endothermic, the throughput rate can be limited by the heat transfer rate from the burners, through the reformer tube, to the hydrocarbon, among other limiting factors. To maximize radiant heat transfer, the burners are fired at high loads, resulting in high temperatures in the radiant section.

The bulk of the heat transfer to the reformer tube is radiant, generating a hot flue gas. The flue gas generated in the radiant section can be vented through an exhaust. To recover the heat from the flue gas, various convective heat transfer structures can be disposed in the exhaust. One such structure is known as a "pre-reformer," which can use the recovered heat to at least partially reform the hydrocarbon prior to its entry into the reformer tube of the radiant section. Typically, the high temperature of the flue gas presents a challenge to recovering the flue gas heat in the pre-reformer as the structures can weaken and/or fail over time. What is needed, therefore, is an apparatus, method, and system for efficiently reforming hydrocarbon, while preserving a long useful life of the structure.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Figure 1:
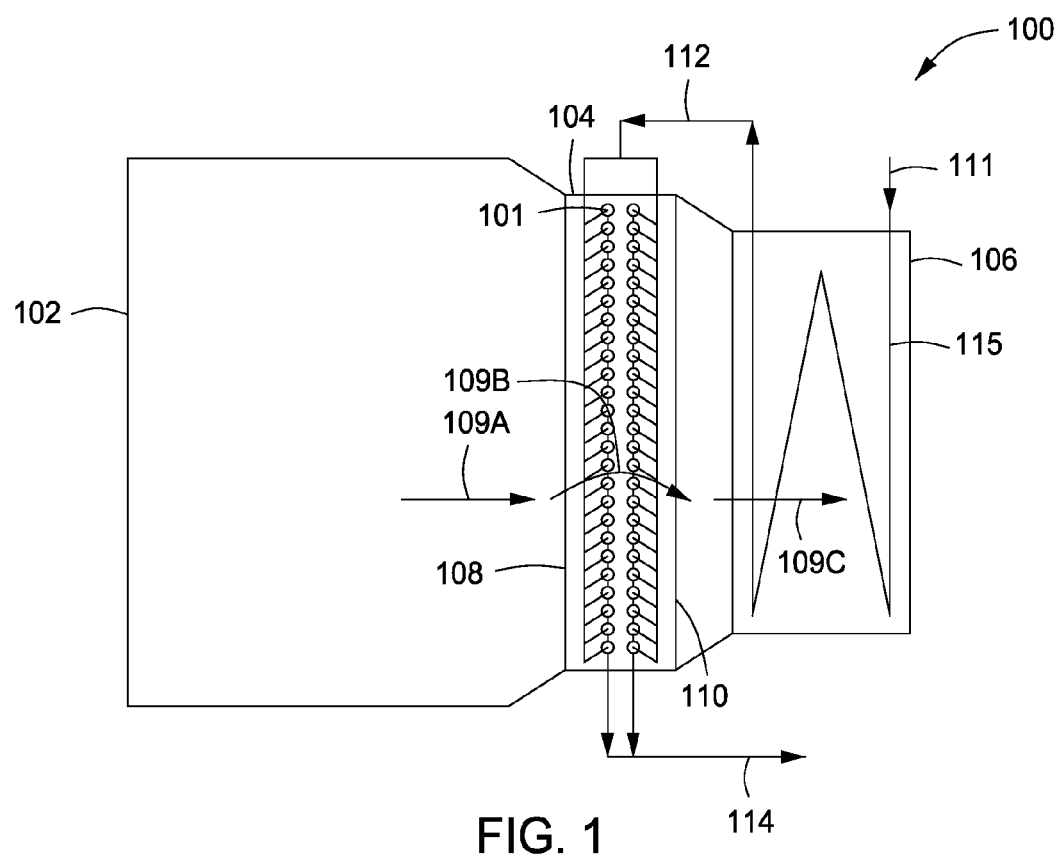
FIG. 1 depicts a partial plan view of an illustrative reforming furnace, according to one or more embodiments described.

FIG. 1 depicts a simplified plan view of an illustrative reforming furnace 100, in which one or more pre-reformer tubes 101 can be disposed. The reforming furnace 100 can generally include a radiant section 102, a transition section 104, and a convection section 106. The transition section 104 can be coupled to a radiant section exhaust 108, and the convection section 106 can be coupled to a transition section exhaust 110 of the transition section 104. Accordingly, a flue gas (not shown) from the radiant section 102 can proceed out through the exhaust 108, the transition section 104, the transition section exhaust 110, and the convection section 106, as depicted by arrows 109A, 109B, and 109C.

The flue gas can be used to heat any structures or devices in its path, for example, the pre-reformer tubes 101, which can be located in the transition section 104. In one or more embodiments, the temperature of the flue gas in the radiant section exhaust 108 proximal the transition section 104 can be sufficiently low so as to avoid damaging and/or reducing the effective life of the pre-reformer tubes 101. For example, the temperature of the flue gas exhaust entering the transition section 104, as generally represented by arrow 109A, can range from a low of about 480° C., about 495° C., about 510° C., about 525° C., about 535° C., about 550° C., about 565°

C., about 580° C. or about 590° C. to a high of about 675° C., about 690° C., about 705° C., about 720° C. about 735° C., about 750° C., about 765° C., about 780° C., about 790° C., about 850° C. or about 900° C. The flue gas can have a mass flow rate through the transition section 104 of from about 250,000 lbs/hr, about 265,000 lbs/hr, about 280,000 lbs/hr, about 295,000 lbs/hr, about 300,000 lbs/hr, about 315,000 lbs/hr, about 330,000 lbs/hr, about 345,000 lbs/hr, or about 350,000 lbs/hr to about 400,000 lbs/hr, about 415,000 lbs/hr, about 430,000 lbs/hr, about 445,000 lbs/hr, about 450,000 lbs/hr, about 460,000 lbs/hr, about 475,000 lbs/hr, about 495,000 lbs/hr or about 500,000 lbs/hr. The pre-reformer tubes 101 can thus be heated to an average tube metal temperature of from about 500° C., about 520° C., about 540° C., about 560° C., about 580° C., or about 600 to about 740, about 760, about 780, about 800° C., about 820° C., or about 840° C.

Furthermore, the flue gas can heat any convective heat transfer devices disposed in the convection section 106. For example, the flue gas can heat one or more heating tubes 115. The temperature of the flue gas entering the convection section 106 can be less than its temperature prior to its entering the transition section 104, given the heat transferred to the pre-reformer tubes 101 in the transition section 104. To account for the lower temperature, the convection section 106 can have a smaller cross-sectional flowpath area than the transition section 104, thereby accelerating the flow of flue gas therethrough and increasing the convective heat transfer rate. The flue gas can heat a hydrocarbon introduced to the heating tubes 115 via line 111, resulting in a heated first hydrocarbon via line 112. In one or more embodiments, the hydrocarbon in line 111 can also be heated by one or more other heat exchanging devices (not shown) located upstream from the reforming furnace 100. In one or more embodiments, the temperature of the first heated hydrocarbon in line 112 can range from a low of about 370° C., about 380° C., about 385° C., about 400° C., or about 410° C. to a high of about 430° C., about 435° C., about 440° C., about 445° C., about 450° C., about 465° C., about 475° C., about 480° C., about 500° C., about 525° C., or about 550° C.

The pre-reformer tubes 101, heated by the flue gas, can receive the heated first hydrocarbon via line 112, with any necessary ducts, headers, and/or manifolds directing the hydrocarbon via line 112 thereto. The pre-reformer tubes 101 can contain a catalyst therein, and can at least partially reform the hydrocarbon introduced via line 112, for example, in the presence of steam, to produce a partially-reformed or "pre-reformed" hydrocarbon in line 114. As shown, the line 114 can be external to the pre-reformer tubes 101. In one or more embodiments, the pre-reformed hydrocarbon can exit the pre-reformer tubes 101 via line 114 at a temperature of about 425° C., about 450° C., about 470° C., or about 490° C. to about 600° C., about 620° C., about 640° C., or about 660° C. In one or more embodiments, the reformed hydrocarbon can exit the pre-reformer tubes 101 at a rate of about 180,000 lbs/hr, about 200,000 lbs/hr, about 220,000 lbs/hr, or about 240,000 lbs/hr to about 260,000 lbs/hr, about 280,000 lbs/hr, about 300,000 lbs/hr, or about 320,000 lbs/hr. In one or more embodiments, the pre-reformed hydrocarbon via line 114 can have a dry-basis CO content of from about 0.1 mol %, about 0.5 mol %, or about 1 mol % to about 5 mol %, about 7 mol %, about 9 mol %, about 11 mol %, or about 13 mol %. In one or more embodiments, the pre-reformed hydrocarbon via line 114 can have a dry-basis $H_2$ content of from about 6 mol %, about 8 mol %, or about 10 mol % to about 20 mol %, about 22 mol %, about 24 mol %, about 26 mol %, or about 28 mol %.

In one or more embodiments, the pre-reformed hydrocarbon via line 114 can proceed to one or more reformer tubes (not shown) disposed in the radiant section 102, via any necessary manifolds, headers, and/or ducts, for further reforming. It will be appreciated, however, that the pre-reformed hydrocarbon via line 114 can instead proceed from the pre-reformer tubes 101 to other reforming structures, components, and/or devices in addition to, or prior to reaching the reformer tube(s), without departing from the scope of this disclosure.

Figure 2:
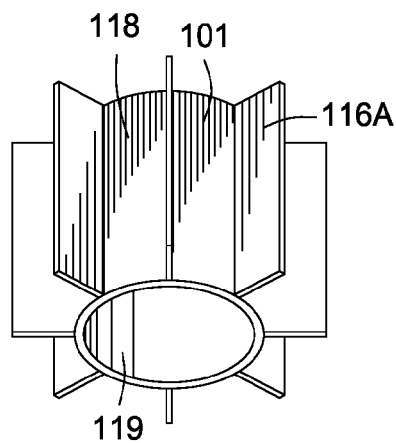
FIG. 2 depicts an elevated isometric view of a portion of an illustrative pre-reformer tube, according to one or more embodiments described.

FIG. 2 depicts a portion of an illustrative pre-reformer tube 101, having extended surfaces 116A disposed thereon, according to one or more embodiments. As shown, in at least one specific embodiment, the extended surfaces 116A can be fins 116A. The fins 116A can be thin or thick compared to the diameter of the pre-reformer tube 101, and can extend a distance or height outward from the exterior surface of the pre-reformer tube 101. The height of the fins 116A can be limited by the temperature of the flue gas proceeding through the transition section 104, as the temperature to which the fins 116A are heated increases proceeding outwardly along the height of the fins 116A. Each fin 116A can have the same height, or the fins 116A can have varying heights. Further, the fins 116A can extend longitudinally along the outside of the pre-reformer tube 101.

The fins 116A can be coupled to a generally cylindrical outer wall 118 of the pre-reformer tube 101 in any suitable manner. For example, the fins 116A can be welded or fastened to the outer wall 118, or the fins 116A can be cast during the fabrication of the pre-reformer tube 101, such that the outer wall 118 and the fins 116A are integrally-formed. In various embodiments, the fins 116A can be attached by braising, slid and fixed in dovetail slots (not shown), and/or attached to the outer wall 118 using any other coupling process or mechanism. Furthermore, any number of fins 116A can be disposed at uniform, patterned, or random angular intervals around the outer wall 118, such that a desired heat transfer rate can be attained. The fins 116A can extend along the entire length of the pre-reformer tube 101, or can be separated and spaced at longitudinal intervals, as desired. Further, the fins may be arranged on the pre-reformer tube 101 in any orientation known to those of skill in the art of heat transfer apparatus, such as single, double or more helical orientations.

In one or more embodiments, the outer wall 118 of pre-reformer tube 101 can define a hollow bore 119 therein. The hollow bore 119 can be at least partially filled with one or more catalysts during operation of the pre-reformer tube 101. In one or more embodiments, the outer wall 118 and/or the fins 116A can be constructed from stainless steel, HK-40, HP Mod, HP Mod MA, high-temperature service material, combinations thereof, alloys thereof, or like materials. In one or more embodiments, the outer wall 118 can have an outer diameter of about 50 mm, about 60 mm, about 70 mm, about 80 mm, about 90 mm, or about 100 mm to about 180 mm, about 190 mm, about 200 mm, about 210 mm, or about 220 mm. For example, the outer wall 1118 can have an outer diameter of about 50 mm, about 140 mm, or about 200 mm. In one or more embodiments, the outer wall 118 can have a wall thickness of about 5 mm, about 7 mm, about 9 mm to about 15 mm, about 17 mm, about 19 mm, about 21 mm, or about 23 mm.

Figure 3:
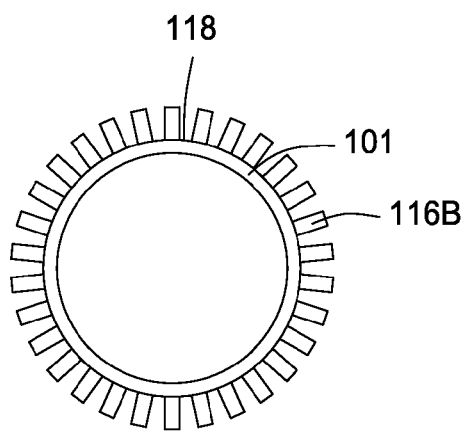
FIG. 3 depicts a cross-sectional view of another illustrative pre-reformer tube, according to one or more embodiments described.

FIG. 3 depicts a cross-sectional view of a portion of another illustrative pre-reformer tube 101. As shown, in at least one specific embodiment, the pre-reformer tube 101 can include one or more extended surfaces 116B, which can be referred to herein as studs 116B. The studs 116B can extend a length or height out from the surface of the outer wall 118, with the height limited by the temperature of the flue gas in the transition section 104 (FIG. 1), as discussed above with reference to the fins 116A (FIG. 2). The studs 116B can be generally cylindrical, but in various embodiments, can be any shape. The studs 116B can be disposed at uniform, patterned, or random angular intervals circumferentially around the outer wall 118. In one or more embodiments, the studs 116B can be welded to, braised to, or cast with the outer wall 118. In one or more embodiments, the studs 116B can be fastened to the outer wall 118, such as with bolts extending through the outer wall 118 and to threaded holes in the outer wall 118. In various other embodiments, the studs 116B can be coupled to the outer wall 118 using any suitable coupling process or mechanism.

Figure 4:
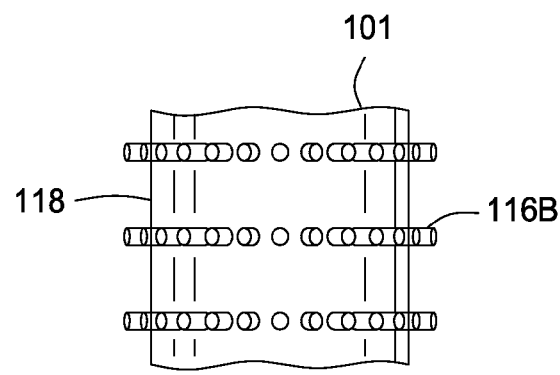
FIG. 4 depicts an isometric view of a portion of the illustrative pre-reformer tube of FIG. 3, according to one or more embodiments described.

FIG. 4 depicts an isometric view of the portion of the illustrative pre-reformer tube 101 of FIG. 3, according to one or more embodiments. As illustrated, the studs 116B can be disposed in rows circumferentially around the outer wall 118. The rows can be positioned at uniform, patterned, or random axial distances from each other. The studs 116B in adjacent rows can be angularly-aligned with respect to one another, can be offset from each other, or can be randomly placed, and any number of studs 116B can be used to attain a desired heat transfer rate. The studs 116B can all have the same height, or the studs 116B can vary in height in each row and/or from row to row. Further, the studs may be arranged on the pre-reformer tube 101 in any orientation known to those of skill in the art of heat transfer apparatus, such as single, double or more helical orientations.

Figure 5:
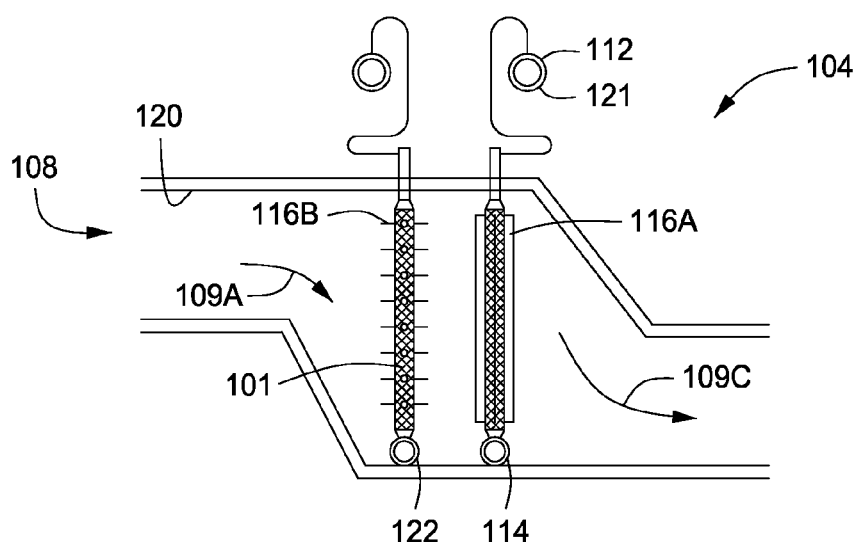
FIG. 5 depicts an elevation view of an illustrative transition section, according to one or more embodiments described.

FIG. 5 depicts an elevation view of an illustrative version of the transition section 104, in which the pre-reformer tubes 101 can be disposed. As shown, the pre-reformer tubes 101 can include the fins 116A and/or the studs 116B. In one or more embodiments, the pre-reformer tubes 101 can be arranged, for example, in one row, two rows, or more than two rows of multiple pre-reformer tubes 101, as shown, and can be transversely oriented in a passageway 120 extending between the radiant section exhaust 108 to the transition section exhaust 110. The line 112 connected to the pre-reformer tubes 101 can include a manifold (not shown) such that the heated hydrocarbon in line 112 can be distributed among the pre-reformer tubes 101. On the exit side of the pre-reformer tubes 101, which can be, in at least one specific embodiment, the bottom of the pre-reformer tubes 101, the pre-reformed hydrocarbon can be gathered into line 114 via another manifold (not shown).

Figure 6:
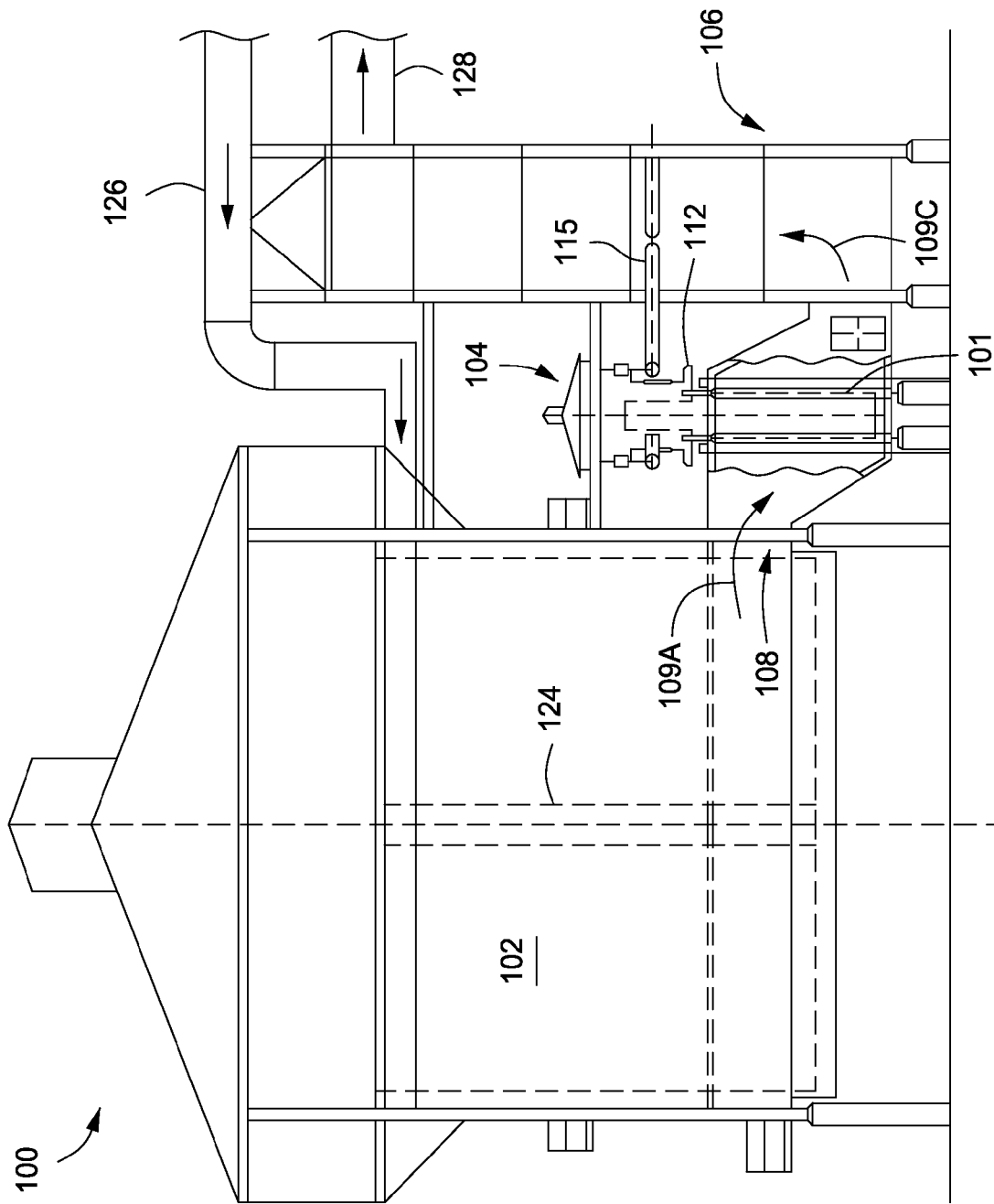
FIG. 6 depicts a partially broken-away side view of an illustrative reforming furnace, according to one or more embodiments described.

FIG. 6 depicts a partially broken-away side view of an illustrative version of the reforming furnace 100. The reforming furnace 100 can be steam-methane reformer ("SMR") that can include a combination of radiant and convective reformers that operate at a relatively low heat duty. For example, the reforming furnace 100 can include one or more radiantly-heated reformer tubes 124, which can be disposed in the radiant section 102 in any orientation, for example, vertically oriented. In one or more embodiments, the pre-reformer tubes 101 can be laterally offset from the reformer tubes 124, as shown. Furthermore, in one or more embodiments, the radiant section exhaust 108 can be disposed on a side of the radiant section 102, for example, proximal the bottom thereof.

The burners (not shown) in the radiant section 102 can radiantly heat the reformer tubes 124 disposed therein, and can also generate a flue gas using a combustion air source (not shown) introduced to the radiant section 102 via an inlet 126. The flue gas can exit the radiant section 102 via the radiant section exhaust 108, as shown by arrow 109A, and can traverse the transition section 104 at an increased velocity, as the flowpath area of the transition section 104 can be smaller than that of the radiant section 102, as shown. The flue gas can then proceed through the convection section 106, as shown by arrow 109C, at still a greater velocity due to the still smaller flowpath area therethrough, and can heat the heating tubes 115, and any other structures, in its path. The flue gas can then exit from the reforming furnace 100 via exhaust 128, for use in additional heat or other energy extraction processes or be vented to the atmosphere.

In one or more embodiments, the reformer tubes 124 can be single-walled and filled with a catalyst. In one or more embodiments, the reforming furnace 100 can include about 50 or more, about 100 or more, about 200 or more, about 400 or more, about 500 or more, about 600 or more, about 700 or more, about 800 or more, about 900 or more, or about 1,000 or more reformer tubes 124. The reformer tubes 124 can have an inside diameter ranging from a low of less than 40 mm, about 40 mm, about 50 mm, or about 65 mm to a high of about 90 mm, about 100 mm, or about 115 mm or more. For example, the inner diameter of one or more of the reformer tubes 124 can be about 70 mm, about 75 mm, or about 80 mm. The diameter of the one or more reformer tubes 124 can reduce or minimize the radial temperature gradient of the tubes.

In one or more embodiments, the reforming furnace 100 can operate at a temperature in the radiant section 102 of from about 590° C. to about 650° C., for example from about 615° C. to about 620° C., and can have a heat output of from about 90 MMBTU/hr to about 120 MMBtu/hr, for a 1500 t/d ammonia plant. About 55% to about 65% of the heat produced within the reforming furnace 100 can be utilized for reforming the first hydrocarbon introduced via line 114 (FIG. 1). The amount of fuel required to generate the necessary heat for the reforming furnace 100 can range from a low of about 135 MMBtu/hr, about 140 MMBtu/hr, or about 145 MMBtu/hr to a high of about 160 MMBtu/hr, about 170 MMBtu/hr, or about 180 MMBtu/hr.

The fuel combusted to generate the heat within the reforming furnace 100 can include low grade fuel sources in addition to, or instead of, fresh natural gas or other high quality hydrocarbons. Such low grade fuel sources can include, but are not limited to, off-gases from a coal gasifier, off-gasses from other chemical plants, off-gases from other combustion processes, bio or biological off-gasses, or the like. Use of a low grade fuel can reduce the demand and requirements for a high grade and/or fresh hydrocarbon that can be converted to syngas.

The low grade fuel used to provide heat in the reforming furnace 100 can have a heating value ranging from a low of about of about 1,863 kJ/m$^3$ to about 2,794 kJ/m$^3$; about 1,863 kJ/m$^3$ to about 3,726 kJ/m$^3$; about 1,863 kJ/m$^3$ to about 4,098 kJ/m$^3$; about 1,863 kJ/m$^3$ to about 5,516 kJ/m$^3$; about 1,863 kJ/m$^3$ to about 6,707 kJ/$^3$; about 1,863 kJ/m$^3$ to about 7,452 kJ/m$^3$; about 1,863 kJ/m$^3$ to about 9,315 kJ/m$^3$; or about 1,863 kJ/m$^3$ to about 10,246 kJ/m$^3$. The low grade fuel can have components that are normally unsuitable for use as process feed in a reforming process.

The reforming furnace 100 can be a revamped or modified traditional SMR or other primary reformer used to produce syngas. For example, the transition section 104 can be modular and can be installed in an existing reforming furnace 100. Additional modifications to the revamped reforming furnace 100 can include replacing or retrofitting traditional burners with a differently-designed burner tip that can reduce the firing requirements of the reforming furnace 100 as compared to a traditional SMR. For example, the new burner tips can be designed to uniformly distribute heat in the radiant section 102. However, modification of the burner tips can maintain enough heat output or heating capacity that the reforming furnace 100 can be operated to produce ammonia should an oxygen supply be reduced or fail.

Other modifications can include using a promoted catalyst, for example an alkalized nickel catalyst can be disposed within the upper or first 20-50% of the length of the reformer tubes 124 of the radiant section 102 (as measured from the inlet end of the reformer tube 124). The heat flux required by the reforming furnace 100 can be reduced to about 25% to about 30% of the heat duty required in a traditional SMR. Any existing primary reformer can be revamped or modified to operate under the conditions of the reforming furnace 100. Those reformers can include top-fired furnaces, side-fired furnaces, terrace wall reformers, bottom fired reforming furnaces, or the like. In one or more embodiments, the reforming furnace 100 can be similar to that described in U.S. Pat. No. 6,818,028, which is incorporated herein by reference in its entirety, to the extent not inconsistent with this disclosure.

With reference to FIGS. 1-6, according to one or more embodiments, a hydrocarbon can be introduced to the heating tube 115 of the reforming furnace via line 111. The hydrocarbon can be heated therein, and can then be introduced to one or more of the pre-reformer tubes 101 via line 112. The pre-reformer tubes 101 can be heated by the flue gas exiting the radiant section exhaust 108, and can include a catalyst in the hollow bore 119 thereof. An endothermic reforming reaction can thus occur in the pre-reformer tubes 101, with the reaction having an increased efficiency when compared to that of other pre-reformers, because of the extended surfaces 116A and/or 116B disposed on the outer wall 118 of the pre-reformer tubes 101.

At least a portion of the hydrocarbon in the pre-reformer tubes 101 can thus be reformed to produce a partially-reformed hydrocarbon in line 114. The partially-reformed hydrocarbon can be introduced to the reformer tube(s) 124 via line 114. The reformer tube(s) 124 are disposed in the radiant section 102 and heated therein by the burner(s) (not shown). The partially-reformed hydrocarbon can be further reformed in the reformer tubes 124 to produce a reformed hydrocarbon. Although not shown, the reformed hydrocarbon can then exit the reforming furnace 100.

Figure 7:
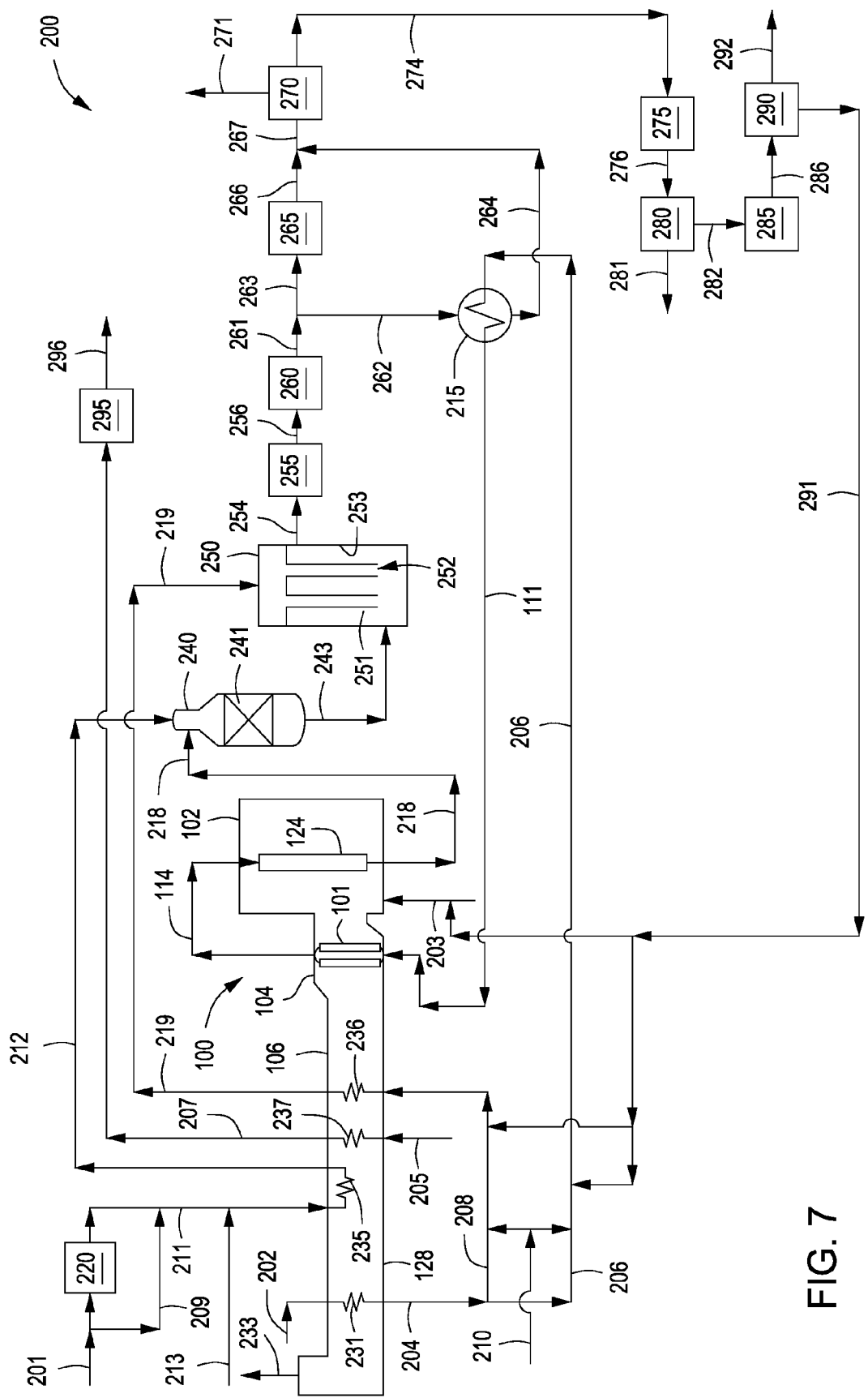
FIG. 7 depicts a schematic view of an illustrative system for reforming a hydrocarbon, according to one or more embodiments described.

FIG. 7 depicts a schematic view of an illustrative system 200 for producing syngas and ammonia using the reforming furnace 100, according to one or more embodiments. The system 200 can include one or more embodiments of the reforming furnace 100 described above, which can be referred to as a first reformer, and which can be operatively coupled to one or more additional reformers (two are shown, 240 and 250). The reforming furnace 100 can also include one or more reformer tubes 124, which can be radiantly heated and disposed in the radiant section 102. In one or more embodiments, the average tube metal temperature of the reformer tubes 124 can be from about 500° C., about 570° C., or about 620° C. to about 675° C., about 735° C., about 790° C., or higher.

The additional reformers 240, 250, which will be described in greater detail below, can reduce the processing duty of the reforming furnace 100 from what it would be if the reforming furnace 100 was stand-alone. As the term is used herein, "processing duty" generally means the amount and/or rate of the reforming reaction that occurs in a given structure or device. Reducing the processing duty can reduce the amount of radiant heat required to drive the endothermic reaction in the reformer tubes 124. This can allow the firing duty of the burners in the radiant section 102 to be reduced. Reducing the firing duty of the burners can reduce the temperature of the flue gas exiting the radiant section 102 and heating the pre-reformer tubes 101. Reduced flue gas temperatures can allow the pre-reformer tubes 101 to include efficiency-enhancing extended surfaces 116A, 116B (FIGS. 2-5). Accordingly, at least some of the processing duty lost by reducing the firing duty in the radiant section 102 can be recovered, yielding increased efficiency in the reforming furnace 100, with little or no additional materials cost.

A hydrocarbon via line 202 can be heated to provide a preheated hydrocarbon via line 204. For example, the hydrocarbon in line 202 can be preheated via one or more heater coils 231 disposed within the exhaust 128 of the reforming furnace 100 to provide a preheated hydrocarbon via line 204. Heated exhaust gas can pass across one or more heating coils 231, with the exhaust gas exiting the exhaust 128 via line 233. The hydrocarbon in line 204 can be heated to a temperature ranging from about 200° C. to about 350° C., for example. Although not shown, the hydrocarbon via line 204 can be further heated in one or more additional heat exchangers. For example, the hydrocarbon via line 204 can be indirectly heated using steam generated in a downstream processing step, such as steam generated from heat produced in a shift converter 260. Further heating the hydrocarbon in line 204 using steam generated in a downstream processing step or an independent heater can be carried out to provide a hydrocarbon in line 204 having a temperature ranging from a low of about 320° C., about 330° C., or about 340° C. to a high of about 390° C., about 400° C., or about 425° C. However, the hydrocarbon in line 202 can be heated to a temperature of from about 340° C. to about 425° C. via the heating coil 231.

The hydrocarbon in line 202 can include one or more liquid or gaseous hydrocarbons, mixtures thereof, or any combination thereof. The hydrocarbon in line 202 can include any one or more $C_1$ to $C_{12}$ hydrocarbons, hydrogen, or any combination thereof. For example, the hydrocarbon in line 202 can include methane, ethane, propane, butane, pentane, hexane, hydrogen, or any combination thereof. The methane concentration in the hydrocarbon in line 202 can range from a low of about 30 mol %, about 50 mol %, or about 75 mol % to a high of about 95 mol %, about 99 mol %, or about 99.9 mol % with the balance including $C_2$, $C_3$, and heavier hydrocarbons. For example, the hydrocarbon in line 202 can have a methane concentration of about 55 mol % or more, about 60 mol % or more, about 65 mol % or more, about 70 mol % or more, about 75 mol % or more, about 80 mol % or more, about 85 mol % or more, or about 90 mol % or more. The hydrogen concentration in the hydrocarbon in line 202 can range from a low of about 0.1 mol %, about 1 mol %, or about 5 mol % to a high of about 20 mol %, about 30 mol %, or about 35 mol %. For example, the hydrocarbon in line 202 can have a hydrogen concentration of about 30 mol % or less, about 25 mol % or less, about 20 mol % or less, about 15 mol % or less, about 10 mol % or less, about 5 mol % or less, or about 1 mol % or less.

The pressure of the hydrocarbon in line 202 can range from a low of about 700 kPa, about 1,000 kPa, or about 1,400 kPa to a high of about 4,000 kPa, about 5,000 kPa, or about 6,000 kPa. The hydrocarbon in line 202 can have a heating value ranging from a low of about 30,000 kJ/m³, about 35,000 kJ/m³, or about 40,000 kJ/m³ to a high of about 50,000 kJ/m³, about 55,000 kJ/m³, or about 60,000 kJ/m³. For example, the hydrocarbon in line 202 can have a heating value of about 33,000 kJ/m³, about 36,000 kJ/m³, or about 39,000 kJ/m³.

The preheated hydrocarbon via line 204 can be split or divided to provide a first hydrocarbon via line 206 and a second hydrocarbon via line 208. Prior to dividing the preheated hydrocarbon in line 204, the preheated hydrocarbon can be desulfurized in one or more desulfurization units (not shown). Steam via line 210 can be introduced to the first hydrocarbon in line 206 and/or to the second hydrocarbon in line 208. The first hydrocarbon in line 206 and the second hydrocarbon in line 208 can have a steam-to-carbon molar ratio (or steam-to-carbon content of the first hydrocarbon) ranging from a low of about 2.6, about 2.7, about 2.8, or about 2.9 to a high of about 3.1, about 3.2, about 3.4, about 3.5, or about 3.6. Although not shown, the steam via line 210 can be introduced to the hydrocarbon in line 202 prior to preheating the hydrocarbon in the coils 231. However, introducing the steam to the first hydrocarbon via line 206 and the second hydrocarbon via line 208 can provide or allow for different hydrocarbon-to-steam molar ratios between the first hydrocarbon in line 206 and the second hydrocarbon in line 208. For example, the first hydrocarbon in line 206 can have a steam-to-hydrocarbon molar ratio of from about 2.9 to about 3 and the second hydrocarbon in line 208 can have a steam-to-hydrocarbon molar ratio of from about 3 to about 3.1.

Although not shown, hydrogen can be introduced to the first hydrocarbon in line 206 and/or the second hydrocarbon in line 208. The hydrogen can be provided, produced, or otherwise obtained from any suitable source located within the system 200 or from outside the system 200, i.e. inside battery limits ("ISBL") or outside battery limits ("OSBL"). For example, as discussed below, at least a portion of the hydrogen that can be introduced to the first hydrocarbon in line 206 and/or the second hydrocarbon in line 208 can be provided from one or more downstream purge gases via line 291. The hydrogen concentration in the first hydrocarbon in line 206 and/or the second hydrocarbon in line 208 can range from a low of about 0 mol %, about 1 mol %, about 2 mol %, or about 3 mol % to a high of about 5 mol %, about 7 mol %, about 8 mol %, or about 10 mol %. Hydrogen can be initially present in or introduced to the hydrocarbon in line 202. However, introducing the hydrogen to the first hydrocarbon in line 206 and/or the second hydrocarbon in line 208 can provide a first hydrocarbon and a second hydrocarbon having different hydrogen concentrations with respect to one another. For example, the first hydrocarbon in line 206 can have a hydrogen concentration ranging from about 1 mol % to about 5 mol % and the second hydrocarbon in line 208 can have a hydrogen concentration ranging from about 1 mol % to about 5 mol %.

The first hydrocarbon in line 206 can include from about 50% to about 90% of the total amount of the hydrocarbon in line 204. The second hydrocarbon in line 208 can include from about 10% to about 50% of the total amount of the hydrocarbon in line 204. For example, the first hydrocarbon in line 206 can include from about 40% to about 80% of the total amount of the hydrocarbon in line 204 and the second hydrocarbon in line 208 can include from about 20% to about 40% of the total amount of the hydrocarbon in line 204. In another example, the amount of the first hydrocarbon in line 206 can be about equal to or up to about nine times more than the amount of the second hydrocarbon in line 208. As such, the first hydrocarbon in line 206 and the second hydrocarbon in line 208 can be different from one another, derived from different sources, or the like.

The first hydrocarbon via line 206 can be indirectly heated in a heat exchanger 215 to produce a heated hydrocarbon via line 111. Heat from a shift converted syngas via line 262, steam (not shown), or any other source (not shown) can be introduced to the heat exchanger 215, where heat can be indirectly transferred from the shift converted syngas product to the first hydrocarbon. The heated first hydrocarbon in line 111 can be at a temperature ranging from a low of about 375° C., bout 390° C., or about 400° C. to a high of about 425° C., about 435° C., about 450° C., or about 475° C.

The first hydrocarbon in line 217 can be reformed in the presence of steam and one or more first catalysts in the reforming furnace 100 to produce a first reformed hydrocarbon via line 218. For example, the first hydrocarbon via line 111 can be introduced to the one or more pre-reformer tubes 101. Pre-reformed hydrocarbon via line 114 can exit the pre-reformer tubes 101 and then be introduced to the catalyst-filled reformer tubes 124, which can be disposed in the radiant section 102 of the reforming furnace 100. A first reformed hydrocarbon via line 218 can exit the reforming furnace 100.

The first reformed hydrocarbon in line 218 can contain hydrogen, carbon monoxide, carbon dioxide, methane, or any combination thereof. The first reformed hydrocarbon in line 218 can include an increased amount of hydrogen and a decreased amount of methane as compared to the first hydrocarbon in line 206. The first reformed hydrocarbon in line 218 can have a hydrogen concentration ranging from a low of about 30 mol %, about 35 mol %, or about 40 mol % to a high of about 45 mol %, about 50 mol %, or about 55 mol %. The first reformed hydrocarbon in line 218 can have a methane concentration ranging from a low of about 30 mol %, about 35 mol %, or about 40 mol % to a high of about 45 mol %, about 55 mol %, about 60 mol %, or about 65 mol %. The first reformed hydrocarbon in line 218 can have a carbon monoxide concentration ranging from a low of about 0.5 mol %, about 1 mol %, or about 2 mol % to a high of about 3 mol %, about 4 mol %, or about 5 mol %. The first reformed hydrocarbon in line 218 can have a carbon dioxide concentration ranging from a low of about 5 mol %, about 7%, or about 9 mol % to a high of about 12 mol %, about 15 mol %, or about 17 mol %. The first reformed hydrocarbon in line 218 can have a hydrogen concentration of from about 40 mol % to about 50 mol %, a methane concentration of from about 35 mol % to about 45 mol %, a carbon monoxide concentration of from about 1 mol % to about 2 mol %, a carbon dioxide concentration of from about 8 mol % to about 12 mol %, with other components such as $C_2$ and heavier hydrocarbons being absent or minimally present, for example at less than about 5 mol %, less than about 4 mol %, less than about 3 mol %, less than about 2 mol %, or less than about 1 mol %.

The first reformed hydrocarbon in line 218 can have a temperature ranging from a low of about 590° C., about 600° C., about 610° C., or about 620° C. to a high of about 630° C., about 640° C., or about 650° C. For example, the first reformed hydrocarbon in line 218 can have a temperature of from about 590° C. to about 640° C., about 590° C. to about 630° C., about 590° C. to about 620° C., or about 590° C. to about 610° C. The pressure of the first reformed hydrocarbon in line 118 can range from a low of about 700 kPa, about 1,000 kPa, or about 1,400 kPa to a high of about 4,000 kPa, about 5,000 kPa, or about 6,000 kPa.

The first reformed hydrocarbon in line 218 can be further reformed in the presence of one or more second catalysts in a second reformer 240 to produce a second reformed hydrocarbon via line 243. For example, the first reformed hydrocarbon via line 218 can be introduced to the second reformer which can be an autothermal reformer ("ATR") 240. An oxidant, such as oxygen-enriched air, can be introduced via line 212 to the ATR 240. The oxygen-enriched air introduced via line 212 can be used to partially combust a portion of the first reformed hydrocarbon introduced via line 218 to provide heat that drives an endothermic reforming reaction within one or more catalyst beds 241 disposed within the ATR 240. The ATR 240 can produce the second reformed hydrocarbon via line 243. The second reformed hydrocarbon in line 243 can have a temperature ranging from a low of about 950° C., about 975° C., or about 1,000° C. to a high of about 1,050° C., about 1,075° C., or about 1,100° C. The pressure of the second reformed hydrocarbon in line 243 can range from a low of about 700 kPa, about 1,000 kPa, or about 1,400 kPa to a high of about 4,000 kPa, about 5,000 kPa, or about 6,000 kPa.

The second reformed hydrocarbon in line 243 can contain hydrogen, carbon monoxide, carbon dioxide, nitrogen, and other minor components, such as argon and/or methane. The second reformed hydrocarbon in line 243 can have a hydrogen concentration ranging from a low of about 35 mol %, about 40 mol %, about 43 mol %, or about 45 mol % to a high of about 53 mol %, about 55 mol %, about 60 mol %, or about 65 mol %. The second reformed hydrocarbon in line 143 can have a methane concentration less than about 10 mol %, less than about 8 mol %, less than about 6 mol %, less than about 4 mol %, less than about 2 mol %, less than about 1 mol %, less than about 0.5 mol %, less than about 0.3 mol %, or less than about 0.2 mol %. For example, the methane concentration of the second reformed hydrocarbon can range from about 0.1 mol % to about 0.5 mol %, about 0.3 mol % to about 1 mol %, or about 0.6 mol % to about 1.6 mol %. The second reformed hydrocarbon in line 243 can have a carbon monoxide concentration ranging from a low of about 7 mol %, about 9 mol %, or about 11 mol % to a high of about 13 mol %, about 15 mol %, or about 17 mol %. The second reformed hydrocarbon in line 243 can have a carbon dioxide concentration ranging from a low of about 7 mol %, about 9 mol %, or about 11 mol % to a high of about 13 mol %, about 15 mol %, or about 17 mol %. The second reformed hydrocarbon in line 243 can have a nitrogen concentration ranging from a low of about 10 mol %, about 25 mol %, or about 30 mol % to a high of about 35 mol %, about 37 mol %, or about 40 mol %. In at least one specific embodiment, the second reformed hydrocarbon in line 143 can have a hydrogen concentration of from about 10 mol % to about 50 mol %, a carbon monoxide concentration of from about 9 mol % to about 12 mol %, a carbon dioxide concentration of from about 9 mol % to about 12 mol %, a nitrogen concentration of about 12 mol % to about 40 mol %, and a methane concentration of less than about 1 mol %.

Prior to introducing the oxygen-enriched air via line 212 to the second reformer 240, the oxygen-enriched air can be preheated to a temperature of from about 375° C. to about 475° C. For example, the oxygen-enriched air via line 211 can be introduced to a heating coil 235 disposed within the exhaust 128 of the reforming furnace 100. As shown, the oxygen-enriched air can be provided from air introduced via line 201 to an air absorption unit 220, which can separate at least a portion of the nitrogen and/or other components from the air to provide oxygen enriched air via line 211. The oxygen-enriched air can contain about 21 vol % oxygen to about 40 vol % oxygen. In one or more embodiments, air via line 209 can bypass the air absorption unit 220 and can be introduced to line 211, which can then be heated in coil 235. Steam via line 213 can be introduced to the oxidant in line 211 (as shown) and/or to the preheated oxidant in line 212 to provide an oxidant and steam mixture. The amount of steam via line 213 introduced to the oxidant in line 211 can produce an oxidant that contains about 1 vol %, about 3 vol %, about 5 vol %, about 7 vol %, or about 10 vol % steam. Although not shown, steam via line 213 can be introduced directly to the second reformer 240, rather than to the oxidant in line 211 or the preheated oxidant in line 212.

The second hydrocarbon in line 208 can be heated. For example, the second hydrocarbon via line 208 can be introduced to a heating coil 236 disposed within the exhaust 128 of the reforming furnace 100 to produce a heated second hydrocarbon via line 219. The heated second hydrocarbon via line 219 can have a temperature ranging from a low of about 475° C., about 500° C., or about 525° C. to a high of about 575° C., about 600° C., or about 625° C.

The second hydrocarbon in line 219 can be reformed in a third reformer 250 to produce a third reformed hydrocarbon. In one or more embodiments, the heated second hydrocarbon via line 219 can be introduced to a tube-side inlet of the third reformer 250 to provide a third reformed hydrocarbon via an exit 252 from one or more catalyst-containing tubes 251.

The third reformed hydrocarbon provided from the one or more exits or openings 252 from the one or more catalyst-containing tubes 251 can contain hydrogen, carbon monoxide, carbon dioxide, and other minor components, such as methane. The third reformed hydrocarbon via the catalyst-containing tubes 251 can have a hydrogen concentration ranging from a low of about 45 mol %, about 50 mol %, about 55 mol %, about 60 mol %, about 65 mol %, about 67 mol %, or about 69 mol % to a high of about 75 mol %, about 77 mol %, or about 80 mol %. For example, the third reformed hydrocarbon via the catalyst-containing tubes 251 can have a hydrogen concentration ranging from about 45 mol % to about 80 mol %, or about 55 mol % to about 80 mol %, or abut 60 mol % to about 80 mol %. The third reformed hydrocarbon via the catalyst-containing tubes 251 can have a methane concentration less than about 10 mol %, less than about 8 mol %, less than about 5 mol %, less than about 3 mol %, less than about 2 mol %, less than about 0.5 mol %, or less than about 0.2 mol %. For example, the methane concentration of the third reformed hydrocarbon can range from about 1 mol % to about 3 mol %. The third reformed hydrocarbon via the catalyst-containing tubes 251 can have a carbon monoxide concentration ranging from a low of about 12 mol %, about 13 mol %, or about 14 mol % to a high of about 15 mol %, about 16 mol %, or about 17 mol %. The third reformed hydrocarbon via the catalyst-containing tubes 251 can have a carbon dioxide concentration ranging from a low of about 5 mol %, about 6 mol %, or about 7 mol % to a high of about 8 mol %, about 9 mol %, or about 10 mol %. In at least one specific embodiment, the third reformed hydrocarbon via the catalyst-containing tubes 251 can have a hydrogen concentration of from about 70 mol % to about 78 mol %, a carbon monoxide concentration of from about 12 mol % to about 16 mol %, a carbon dioxide concentration of from about 6 mol % to about 8 mol %, a methane concentration of less than about 2 mol %.

The second reformed hydrocarbon via line 243 can be introduced to a shell-side 253 of the third reformer 250. The second reformed hydrocarbon introduced via line 143 can be mixed with the third reformed hydrocarbon within the shell-side 253 of the third reformer 150 to provide a mixed reformed hydrocarbon product or syngas product. Although not shown, the third reformed hydrocarbon and the second reformed hydrocarbon can remain separated, i.e. independent from one another. For example, the second reformed hydrocarbon can be maintained separate from the third reformed hydrocarbon recovered via the exits 252 of the tubes 251 by a tube sheet, for example. Although not shown, the third reformed hydrocarbon and the second reformed hydrocarbon can be mixed with one another outside the third reformer exchanger 250.

Heat required for endothermic reforming reactions within the catalyst-containing tubes 251 of the third reformer 250 can be provided from the second reformed hydrocarbon. The second reformed hydrocarbon introduced via line 243, either alone or mixed or otherwise combined with the third reformed hydrocarbon, can flow along the outside of the one or more catalyst-containing tubes 251, thereby indirectly transferring heat from the second reformed hydrocarbon to the second hydrocarbon introduced via line 219 to the third reformer 250.

As shown in FIG. 7, the second reformed hydrocarbon introduced via line 243 to the third reformer 250 and the third reformed hydrocarbon provided via the exit(s) or opening(s) 252 from the one or more catalyst-containing tubes 251 can be mixed within the shell-side 253 of the third reformer to provide a reformed product or syngas. The syngas can be recovered from the shell-side 253 of the third reformer via line 254. However, as mentioned above, depending on the particular design of the third reformer 250, the second reformed hydrocarbon and the third reformed hydrocarbon can remain independent of one another or mixed outside the third reformer 250. For example, a tube sheet can be disposed between the introduction of the second reformed hydrocarbon to the shell-side 253 of the third reformer and the exit(s) or openings) 252 from the one or more catalyst containing tubes 251.

The syngas via line 254 can have a temperature ranging from a low of about 650° C., about 660° C., or about 670° C. to a high of about 775° C., about 800° C., or about 825° C. The syngas in line 254 can have a hydrogen concentration ranging from a low of about 45 mol %, about 47 mol %, or about 50 mol % to a high of about 55 mol %, about 57 mol %, about 60 mol %, or about 65 mol %. The syngas in line 254 can have a carbon monoxide concentration ranging from a low of about 9 mol %, about 11 mol %, or about 12 mol % to a high of about 13 mol %, about 14 mol %, or about 15 mol %. The syngas in line 254 can have a carbon dioxide concentration ranging from a low of about 6 mol %, about 7 mol %, or about 8 mol % to a high of about 10 mol %, about 11 mol %, or about 12 mol %. The syngas in line 254 can have a nitrogen concentration ranging from a low of about 20 mol %, about 23 mol %, or about 25 mol % to a high of about 35 mol %, about 37 mol %, or about 40 mol %. The syngas in line 254 can have a methane concentration of less than about 10 mol %, less than about 8 mol %, less than about 6 mol %, less than about 4 mol %, less than about 3 mol %, less than about 2 mol %, less than about 1 mol %, or less than about 0.5 mol %. For example, the methane concentration of the syngas in line 154 can range from about 0.3 mol % to about 2 mol %.

The reforming furnace 100 can be steam-methane reformer ("SMR") that can include a combination of radiant and/or convective reformers that operate at a relatively low heat duty. The reforming furnace 100 can be referred to as a "lite" reformer. For example, the reforming furnace or lite reformer 130 can operate at a temperature of from about 590° C. to about 650° C., for example from about 615° C. to about 620° C., and can have a heat output of from about 90 MMBTU/hr to about 120 MMBtu/hr, for a 1500 t/d ammonia plant. In one or more embodiments, about 40% or more, about 45% or more, about 50% or more, or about 55% or more of the heat produced within the reforming furnace 100 can be utilized for reforming the first hydrocarbon introduced via lines 111 and 114. For example, from about 55% to about 65%, about 55% to about 70%, or about 50% to about 65% of the heat produced within the reforming furnace 100 can be utilized for reforming the first hydrocarbon introduced via lines 111 and 114. The amount of fuel required to generate the necessary heat within the reforming furnace 100 can range from a low of about 135 MMBtu/hr, about 140 MMBtu/hr, or about 145 MMBtu/hr to a high of about 160 MMBtu/hr, about 170 MMBtu/hr, or about 180 MMBtu/hr for a 1,500 t/d ammonia plant.

The fuel combusted to generate the heat within the reforming furnace 100 can include low-grade fuel sources rather than fresh natural gas or other high-quality hydrocarbon feeds. Suitable low-grade fuel sources can include, but are not limited to, biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. Other suitable low grade fuel sources can include off-gases produced from the gasification of biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. The hydrocarbon-based polymeric materials can include, but are not limited to, thermoplastics, elastomers, rubbers, polypropylenes, polyethylenes, polystrenes, other polyolefins, homo-polymers, co-polymers, block co-polymers, polyethylene terephthalate, poly blends, or any combination thereof.

Use of low-grade fuel can reduce the demand and requirements for high-grade and/or fresh hydrocarbon that can be converted to the syngas in line 254 via the reformers 100, 240, 250. Use of low grade fuel can provide substantial cost reductions, increased flexibility in the operation of the system 200, and/or allow for an increase in the amount of syngas produced from the system 200, while still only requiring the same amount of hydrocarbon via line 202 to produce the syngas via line 254. For example, existing plants require a portion of the hydrocarbon in line 202 to heat the reforming furnace 100, which generates heat rather than syngas product via line 254. The reforming furnace 100 can be adapted or modified or constructed to operate on the lower-grade fuel, thereby allowing as much of the high-grade hydrocarbon in line 202 as possible to be converted to the syngas in line 254.

The low-grade fuel used to provide heat in the reforming furnace 100 can have a heating value ranging from a low of about 50 kJ/m$^3$, about 100 kJ/m$^3$, or about 500 kJ/m$^3$ to a high of about 7,450 kJ/m$^3$, about 9,300 kJ/m$^3$, or about 10,250 kJ/m$^3$. For example, the low-grade fuel used to provide heat in the reforming furnace 100 can have a heating value of about 50 kJ/m$^3$ to about 100 kJ/m$^3$, about 50 kJ/m$^3$ to about 2,794 kJ/m$^3$; about 400 kJ/m$^3$ to about 3,726 kJ/m$^3$; about 1,000 kJ/m$^3$ to about 4,098 kJ/m$^3$; about 1,500 kJ/m$^3$ to about 5,516 kJ/m$^3$; about 1,800 kJ/m$^3$ to about 6,707 kJ/$^3$; about 1,300 kJ/m$^3$ to about 7,452 kJ/m$^3$; about 1,100 kJ/m$^3$ to about 9,315 kJ/m$^3$; or about 1,863 kJ/m$^3$ to about 10,246 kJ/m$^3$. The low-grade fuel can have components that are normally unsuitable for use as process feed to stock in a reforming process.

The reforming furnace 100 can be a revamped or modified traditional SMR or other primary reformer used to produce syngas. For example, the burners tips within a traditional SMR can be replaced with a differently designed burner tip that can reduce the firing requirements of the first reformer 130 as compared to a traditional SMR and can be designed to uniformly distribute heat in the revamped or first reformer 130 configuration. However, modification of the burner tips can maintain enough heat output or heating capacity that the system 200 can be operated to produce ammonia should an oxygen supply be reduced or fail. Other modifications can include using a promoted catalyst, for example an alkalized nickel catalyst can be disposed within the upper or first 20-50% of the radiant tubes 124 within the reforming furnace 100. Modifying or revamping an existing SMR can reduce the heat flux required by the reforming furnace 100 to about 25% to about 30% of the heat duty required in a traditional SMR. Any existing primary reformer can be revamped or modified to operate under the conditions of the reforming furnace 100. Those reformers can include top-fired furnaces, side-fired furnaces, terrace wall reformers, bottom fired reformer furnaces, or the like.

As mentioned above, the second reformer 240 can be an autothermal reformer. For example, the second reformer 240 can include one or more of the catalyst beds 241, which can at least partially reform the first reformed hydrocarbon introduced via line 218. The one or more catalyst beds 241 can include a single type of catalyst or a mixture of different types of catalyst. In another example, the catalyst bed 241 can include two catalyst beds 241 with a first catalyst bed having a first catalyst and a second catalyst bed having a second catalyst that is different from the first catalyst. The one or more oxidants via line 212 can be introduced to a burner within the ATR, which can combust a portion of the first reformed hydrocarbon introduced via line 218 to provide heat that can be used to further endothermically reform at least a portion of the first reformed hydrocarbon within the one or more catalyst beds 241.

The third reformer 250 can be any type of reforming exchanger and are well-known in the art. As illustrated, the third reformer 250 can be a shell-and-tube type exchanger that includes one or more tubes 251 at least partially disposed within the shell-side 253 of the third reformer 150. One or more catalysts can be disposed within the one or more tubes 251 to provide the one or more catalyst-containing tubes 251. The one or more catalyst-containing tubes 251 can be arranged in any pattern or configuration within the shell of the third reformer 250. Although not shown, the catalyst-containing tubes 251 can include, but are not limited to, one or more fins, static mixers, rifling, heat conductive packing, turbulence-causing projections, or any combination thereof, disposed on the external surface and/or the internal surface of the catalyst-containing tubes 251. The one or more catalyst-containing tubes 251 can be of various types, for example, straight tubes, bayonet tubes (not shown), U-tubes (not shown), coiled tubes (not shown), or any combination thereof. The one or more catalyst-containing tubes 251 can be disposed in vertical, horizontal, or at any other angle within the third reformer 150. The one or more reforming exchangers can include a KBR Reforming Exchanger System ("KRES"). Additional KRES process conditions, catalysts, and other details can be found in U.S. Pat. Nos. 5,011,625; 5,122,299; 5,362,454; 6,855,272; 7,138,001; and 7,220,505, which are fully incorporated by reference herein. Additional reforming exchanger types, catalyst types, process conditions, and other details can be found in U.S. Pat. Nos. 7,074,347 and 6,224,789, which are incorporated by reference herein.

The one or more catalysts disposed in the catalyst-containing reforming tubes 124 and pre-reformer tubes 101 disposed within the reforming furnace 100, the one or more catalyst beds 241 disposed within the ATR 240, and the one or more catalyst-containing tubes 251 disposed within the third reformer 250 can be the same or different, with respect to one another. Suitable catalysts can include, but are not limited to, noble metals, cobalt, nickel, oxides thereof, derivatives therefore, or combinations thereof. The one or more catalysts can be supported by one or more support materials. The one or more support materials can include, but are not limited to, alumina, refractory alumina, magnesium aluminate, calcium aluminate, calcium aluminate titanate, zirconia, cerium modified zirconia, or any combination thereof. An illustrative catalyst including nickel can have a nickel concentration ranging from a low of about 5 percent by weight ("wt %"), about 10 wt %, or about 12 wt % to a high of about 15 wt %, about 20 wt %, or about 25 wt %. The catalysts can be prepared in any desired shape or form by a variety of methods, for example, briquetting, tabletting, etc. The shape of the catalyst can be in the form of extruded, briquetted or tabletted cylinders, polylobal extrusions, spheres, rings, hollow core cylinders, solid cylinders, hollow core cylinders with grooves on the inside and/or outside surfaces, or any other appropriate geometric shape.

Referring again to the syngas in line 254, the syngas can be further processed to provide one or more products, such as ammonia. The syngas via line 254 can be introduced to a first waste heat boiler ("WHR") unit 255, which can indirectly transfer a portion of the heat from the syngas to a heat transfer medium, for example boiler feed water (not shown) to provide a cooled syngas via line 256. The cooled syngas via line 256 can be introduced to one or more shift converter systems 260 to provide a shift converted syngas via line 261. In at least one specific embodiment, at least a portion of the shift converted syngas in line 261 can be introduced via line 262 to the heat exchanger 215, where heat can be transferred from the shift converted syngas to the first hydrocarbon introduced via line 206 to provide the heated first hydrocarbon via line 111 and a first cooled shift converted syngas via line 264. However, other heat transfer mediums, such as steam generated in the first WHR unit 255 or the second WHR unit 265, or other source can be used to provide the heated first hydrocarbon via line 111. At least a portion of the shift converted syngas in line 261 can be introduced via line 263 to a second WHR unit 265 which can indirectly transfer a portion of the heat from the syngas to a heat transfer medium, for example boiler feed water (not shown) to produce a second cooled shift converted syngas via line 266. Although not shown, the WHR unit 255 and/or WHR unit 265 can include direct quenching to provide the cooled syngas via line 256 and/or 266. For example, boiler feed water can be directly introduced and mixed with the syngas introduced via line 254 to the WHR unit 255 and/or the shift converted syngas introduced via line 263 to the WHR unit 265. The shift converter 260 can be a high temperature shift converter ("HTSC") that can be operated at an inlet temperature of from about 380° C. to about 450° C. to provide a shift converted syngas having a temperature of from about 445° C. to about 500° C.

As illustrated, a first portion of the shift converted syngas via line 262 can be introduced to the heat exchanger 215 and a second portion of the shift converted syngas via line 263 can be introduced to the second WHR unit 265. All the shift converted syngas via line 261 can be introduced to the heat exchanger 215 or to the second WHR unit 265. As illustrated, the first cooled shift converted syngas in line 264 and the second cooled shift converted syngas in line 266 can be combined or otherwise mixed to provide a cooled shift converted syngas via line 167.

Referring again to the one or more shift converter systems 260, the shift converter system 260 can adjust the hydrogen to carbon monoxide ratio ("$H_2$:CO") of the syngas by converting carbon monoxide to carbon dioxide. Within the shift converter system 260, a water-gas shift reaction can react at least a portion of any carbon monoxide in the cooled syngas introduced via line 256 with water in the presence of a catalyst and/or high temperature to produce hydrogen and carbon dioxide. The shift converter system 260 can include, but is not limited to, single-stage adiabatic fixed-bed reactors, multiple-stage adiabatic fixed-bed reactors with interstage cooling, steam-generation or cold-quench reactors, tubular fixed-bed reactors with steam generation or cooling, fluidized-bed reactors, or any combination thereof. For example, a sorption-enhanced water-gas shift ("SEWGS") process, utilizing a pressure swing adsorption unit having multiple fixed bed reactors packed with shift catalyst and high temperature (around 475° C.) carbon dioxide adsorbent, can be used.

The shift converter system 260 can include two or more reactors arranged in series and/or parallel. The shift converter system 260 can include one or more HTSCs, one or more medium temperature shift converters ("MTSC"), one or more low temperature shift converters ("LTSC"), or any combination thereof. At least a portion of the cooled syngas via line 256 can be introduced to one or more HTSCs, MTSCs, and/or LTSCs in any order and/or combination thereof.

The shift converted syngas in line 261 can contain less carbon monoxide than the cooled syngas in line 156. The shift converted syngas in line 261 can contain about 5 mol % or less dry basis carbon monoxide, about 3 mol % or less dry basis carbon monoxide, about 2 mol % dry basis or less carbon monoxide, about 1 mol % or less dry basis carbon monoxide, or about 0.5 mol % dry basis or less dry basis carbon monoxide.

The cooled syngas via line 256 can be apportioned equally or unequally to any one or more of the HTSCs, MTSCs, LTSCs. For example, about 75 vol % of the cooled syngas via line 156 can be introduced to a HTSCs and about 25% can be introduced to a MTSC. The converted syngas from the HTSC and the MTSC can then be introduced to the one or more heat exchangers 215 and/or second WHR units 265.

The one or more HTSCs, MTSCs, and/or LTSCs can contain one or more catalysts. The one or more HTSCs, MTSCs, and LTSCs can convert carbon monoxide in the cooled syngas in line 256 to carbon dioxide by reacting the carbon monoxide in the presence of one or more catalysts within in the one or more HTSCs, MTSCs, and/or LTSCs, at a temperature sufficient to oxidize the carbon monoxide. The catalyst within the one or more HTSCs can include, but is not limited to, iron oxide, zinc ferrite, magnetite, chromium oxides, derivatives thereof, or any combination thereof. The one or more HTSCs can be operated at a temperature of from about 325° C. to about 550° C., or from about 380° C. to about 450° C. The catalyst within the one or more MTSCs can include, but is not limited to, iron oxide, chromium oxide, derivatives thereof, or any combination thereof. The one or more MTSCs can be operated at a temperature of from about 250° C. to about 300° C. The catalyst within the one or more LTSCs can include, but is not limited to, copper, zinc, copper-promoted chromia, derivatives thereof, or any combination thereof. The one or more LTSC can be operated at a temperature from about 180° C. to about 220° C.

Referring again to the cooled shift converted syngas via line 267 the cooled shift converted syngas via line 267 can be introduced to the one or more syngas purification systems 270. The syngas purification system 270 can include, but is not limited to, one or more carbon dioxide removal systems, methanators, driers, or any combination thereof. The cooled shift converted syngas can be introduced via line 267 to the one or more carbon dioxide removal systems to remove at least a portion of the carbon dioxide.

The one or more carbon dioxide removal systems within the syngas purification system 270 can selectively separate carbon dioxide via line 271 from the cooled shift converted syngas to produce a carbon dioxide lean syngas and carbon dioxide. The carbon dioxide lean syngas can be introduced to the one or more methanators within the purification system 270 to convert at least a portion of any carbon monoxide and/or carbon dioxide to methane and water. For example, the methanator can convert most, e.g. greater than about 50%, of the carbon monoxide and/or carbon dioxide to methane and water. The methanator can provide a syngas having a total carbon monoxide and carbon dioxide concentration of less than about 20 ppm carbon monoxide and carbon dioxide, less than about 15 ppm carbon monoxide and carbon dioxide or less, or about 5 ppm carbon monoxide and carbon dioxide or less, or about 2 ppm carbon monoxide and carbon dioxide or less.

The syngas lean in carbon monoxide and carbon dioxide can also be introduced to the one or more optional driers within the purification system 270 to provide a syngas having a reduced amount of water. The one or more driers can remove or separate at least a portion of any water in the carbon monoxide and carbon dioxide lean syngas to provide a dried syngas. In another example, the one or more dries can remove or separate most, e.g., greater than about 50%, of the water from the carbon monoxide and carbon dioxide lean syngas.

The purification system 270 can provide a syngas via line 274 which can have a hydrogen concentration ranging from a low of about 40 mol %, about 50 mol %, or about 55 mol % to a high of about 75 mol %, about 80 mol %, or about 85 mol %. The syngas in line 274 can have a nitrogen concentration ranging from a low of about 10 mol %, about 20 mol %, or about 25 mol % to a high of about 40 mol %, about 45 mol %, or about 50 mol %. The syngas in line 274 can have a carbon dioxide concentration of less than about 3 mol %, less than about 2 mol %, less than about 1 mol %, or less than about 0.5 mol %. The syngas in line 274 can have a carbon monoxide concentration of less than about 3 mol %, less than about 2 mol %, less than about 1 mol %, or less than about 0.5 mol %. The syngas in line 274 can have a methane concentration of less than about 3 mol %, less than about 2 mol %, less than about 1 mol %, or less than about 0.5 mol %. The syngas in line 274 can have an argon concentration ranging from a low of about 0.1 mol %, about 0.5 mol %, or about 0.75 mol % to a high of about 1 mol %, about 1.5 mol %, or about 2 mol %. The hydrogen to nitrogen ($H_2$:$N_2$) molar ratio can range from about 1.5:1 to about 5:1, from about 2:1 to about 4:1, or from about 2.2:1 to about 3.2:1. The $H_2$:$N_2$ molar ratio can be about 2.8:1, about 2.9:1, about 3:1, about 3.1:1, about 3.2:1.

The one or more carbon dioxide removal systems can include any one or a combination of physical, mechanical, electrical and/or chemical systems configured in series, parallel, or any combination thereof. The one or more carbon dioxide removal systems can include one or more physical separation systems including, but not limited to, membrane type systems and solvent based systems. For example, the one or more carbon dioxide removal systems can include, but are not limited to, absorption/desorption type, solvent-based systems. The carbon dioxide removal system can contact the syngas introduced thereto with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (SELEXOL®) process), n-methyl-pyrrolidone, sulfolane, and use of the SULFINOL® Gas Treatment Process.

The one or more methanators can include any one or a combination of physical, mechanical, electrical and/or chemical systems to convert carbon monoxide and carbon dioxide to methane, configured either in series, parallel, or any combination thereof. The one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of from about 200° C. to about 400° C.

The one or more driers can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The syngas via line 274 can be introduced to the one or more compressors 275 to provide a compressed syngas via line 276. The pressure of the compressed syngas in line 276 can range from about 6,000 kPa, about 8,000 kPa, or about 10,000 kPa to a high of about 17,000 kPa, about 20,000 kPa, or about 25,000 kPa. The compressor 275 can be any suitable type of compressor or combination of compressors. For example, the compressor 275 can be a single-stage compressor, a dual-stage compressor, or the like.

The compressed syngas via line 276 can be introduced to the ammonia synthesis unit 280 to provide an ammonia product via line 281 and a purge gas via line 282. The ammonia synthesis unit 280 can include one or more ammonia converters and one or more ammonia condensers (not shown). At least a portion of the nitrogen and hydrogen present in the compressed syngas can combine to provide an ammonia converter product (not shown). The ammonia converter product can have an ammonia concentration ranging from a low of about 5 mol %, about 10 mol %, or about 15 mol % to a high of about 25 mol %, or about 30 mol %. For example, the ammonia concentration of the ammonia converter product can range from a low of about 12 mol %, about 14 mol %, or about 16 mol % to a high of about 22 mol %, about 24 mol %, or about 26 mol %. The hydrogen concentration of the ammonia converter product can range from a low of about 50 mol %, about 55 mol %, or about 60 mol % to a high of about 70 mol %, about 75 mol %, or abut 80 mol %. The nitrogen concentration of the ammonia converter product can range from a low of about 15 mol %, about 20 mol %, or about 25 mol % to a high of about 30 mol %, about 35 mol %, about 40 mol %, or more than abut 40 mol %.

The one or more ammonia converters can be conventional single-pass or multi-pass converters using one or more magnetite catalysts. The one or more ammonia converters can be single-pass or multi-pass converters using one or more noble metal catalysts, or one or more catalysts based upon ruthenium, such as the ruthenium-based KAAP catalyst available from Kellogg Brown and Root, LLC.

The one or more ammonia converters can include any reactor intended to operate at elevated pressures and/or temperatures to convert at least a portion of a feed gas containing nitrogen and hydrogen, e.g. the compressed syngas in line 276, to ammonia. The one or more ammonia converters can include one or more "Split-Flow Ammonia Converters," as discussed and described in U.S. Pat. No. 7,081,230, which is incorporated by reference herein in its entirety to the extent not inconsistent with this disclosure. The one or more ammonia converters can include one or more "Isothermal Ammonia Converters," as discussed and described in U.S. Pat. No. 6,171,570, which is incorporated by reference herein in its entirety to the extent not inconsistent with this disclosure. The one or more ammonia converters can include one or more "Horizontal Ammonia Converter Adapted for High Activity Catalyst," as discussed and described in U.S. Pat. No. 6,132,687, which is incorporated by reference herein in its entirety to the extent not inconsistent with this disclosure. The one or more ammonia converts can include one or more ammonia converters as discussed and described in U.S. Patent Application Publication No.: 2009/0136391, which is incorporated by reference herein in its entirety to the extent not inconsistent with this disclosure.

The ammonia converter product can be introduced to the one or more ammonia condensers. The one or more ammonia condensers can condense and separate the ammonia to provide the ammonia product via line 281 and the purge gas via line 282. The ammonia product via line 281 can contain, but is not limited to, ammonia, hydrogen, and nitrogen. The ammonia product in line 281 can contain a minimum of about 85 wt %, a minimum of about 90 wt %, a minimum of about 95 wt %, or a minimum of 99.9 wt % ammonia. The ammonia product via line 281 can contain a maximum of about 15 wt %, about 10 wt %, about 5 wt % or about 0.1 wt % of combined hydrogen and nitrogen.

The one or more ammonia condensers can include any mechanical or chemical system capable of selectively separating ammonia from a gas mixture including at least hydrogen and nitrogen. The one or more ammonia condensers can include one or more cryogenic purifiers containing one or more refrigeration exchangers and one or more refrigeration compressors.

The purge gas via line 282 can be introduced to an optional purge gas recovery unit 285. The purge gas in line 282 can have a hydrogen concentration ranging from a low of about 35 mol %, about 40 mol %, or about 45 mol % to a high of about 60 mol %, about 65 mol %, or about 70 mol %. The purge gas in line 282 can have a methane concentration ranging from a low of about 2 mol %, about 4 mol %, or about 6 mol % to a high of about 15 mol %, about 17 mol %, or about 20 mol %. The purge gas in line 282 can have a nitrogen concentration ranging from a low of about 18 mol % or about 20 mol % to a high of about 23 mol % or about 25 mol %. The purge gas in line 282 can have an argon concentration ranging from a low of about 2 mol %, about 3 mol %, or about 4 mol % to a high of about 5 mol %, or about 6 mol %. The purge gas recovery unit 285 can recover at least a portion of any hydrogen from the purge gas.

The off gasses via line 286 from the purge gas recovery unit 285 can be introduced to an argon recovery unit 290 to provide a separated argon feed via line 292 and an argon-lean purge gas via line 291. Hydrogen rich product can be recovered from the purge gas recovery unit 285, which can be recycled to the ammonia synthesis unit 285 (not shown). The argon-lean purge gas via line 291 can be recycled to one or more feeds with the system 200. Separated or recovered argon via line 292 can be vented to the atmosphere, sold as a by-product, or otherwise disposed. As illustrated, the hydrogen, methane, and some residual argon via line 291 can be recycled to the first hydrocarbon in line 206 and/or the second hydrocarbon in line 208. In one or more embodiments, the argon recovery unit 290 can be omitted, and the purge gas via line 186 can be introduced to line 191.

Any portion of the purge gas in line 291 can be recycled to the first hydrocarbon in line 206 and/or the second hydrocarbon in line 208 and/or as low grade fuel in line 203. About 50% or more, about 60% or more, about 70% or more, about 80% or more, about 90% or more, or about 100% of the purge gas in line 291 can be recycled to the second hydrocarbon in line 208. About 50% or more, about 60% or more, about 70% or more, about 80% or more, about 90% or more, or about 100% of the purge gas in line 291 can be recycled to the first hydrocarbon in line 206. About 50% or more, about 60% or more, about 70% or more, about 80% or more, about 90% or more, or about 100% of the purge gas in line 291 can be introduced to line 203 and used as low grade fuel for the reforming furnace 100. About 50% or more, about 60% or more, about 70% or more, about 80% or more, about 90% or more, or about 100% of the purge gas in line 191 can be recycled to the first hydrocarbon in line 206, the second hydrocarbon in line 208, the low grade fuel in line 203, or any combination thereof.

In at least one specific embodiment, at least a portion of the purge gas via line 291 can be introduced to or used as the low-grade fuel introduced via line 203 to the reforming furnace 100. About 60% to about 80% of the purge gas in line 291 can be mixed with the first hydrocarbon in line 206 and/or the second hydrocarbon in line 208 and about 20% to about 40% of the purge gas in line 291 can be used as a fuel, such as the low-grade fuel introduced via line 203 to the reforming furnace 100. Recycling at least a portion of the purge gas in line 291 to the first hydrocarbon in line 206 and/or the second hydrocarbon in line 208 can recover methane and/or hydrogen from the purge gas, which can be used for the production of ammonia or other products. Furthermore, combusting about 20% to about 40% of the purge gas in line 291 can reduce or prevent accumulation of argon within the system 200, which can reduce or eliminate the need for the argon recovery unit 290. Likewise, recovering argon via line 292 from the argon recovery unit 290 can allow complete recycle of the purge gas via line 291 to the first hydrocarbon in line 206 and/or the second hydrocarbon in line 208, which can increase the amount of recovered methane and hydrogen that can be converted to ammonia and/or other products. Another benefit of recycling the purge gas via line 291 to the first hydrocarbon in line 206 and/or the second hydrocarbon in line 208 is that an increased hydrogen concentration in the first hydrocarbon feed 206 and/or the second hydrocarbon feed 208 requires less heating and/or processing duty from the reforming furnace 100 to preheat the second hydrocarbon feed 206 and/or to partially reform the first hydrocarbon feed introduced to the first reformer via line 111.

A steam network 295 can produce and/or provide and/or direct and/or control the distribution of steam throughout the system 200. Steam can be produced within process waste heat boilers in the system, which can then be superheated in WHR unit 255. The superheated steam produced within the WHR unit 255 can be further superheated via line 205 in the coil 237, which can be introduced to the steam network 295 via line 207. Any type of steam or combination of types of steam can be superheated in the coil 237 and in the heat exchanger part of the WHR unit 255 (not shown). For example, medium pressure steam, high pressure steam, superheated medium pressure, steam, superheated high pressure steam, or combinations thereof can be superheated in the heating coil 237. For multiple types of steam multiple heating coils 237 can be disposed within the exhaust 128 of the reforming furnace 100, each heating coil 237 having a steam recovery line 205.

The steam network 295 can introduce the steam via one or more steam distribution lines 296 to various systems or units of the system 200. For example, steam via line 296 can be introduced to drive compressor turbines. At least a portion of the source of steam production can be or include the WHR units 255, 265. Other WHR units can in the system 200 can also be used to produce at least a portion of the steam. For example a WHR unit within the ammonia synthesis unit 280 (not shown) can produce at least a portion of the steam. In at least one specific embodiment, a majority of the steam introduced to the steam network 295 can be provided from the WHR units 255 and/or 265 and/or a WHR unit in the ammonia synthesis unit 180.

The steam network 295 can also include one or more supplemental fired boilers for producing steam necessary for the system 200, for example during startup or changes to the process, for example feed inputs are changed. The steam network 295 can include one or more boilers for producing steam necessary for the system 200 to have sufficient steam for the various systems and units of the system 200. In other words, one or more boilers can be continuously operated to produce steam for the system 200.

In one or more embodiments, one or more outside sources (not shown) can be used to provide additional steam to the steam network 195. For example, the outside source can be or include one or more nuclear fission and/or nuclear fusion plants that can provide steam to the steam network 295 and/or directly to one or more various units of the system 200 (not shown). Other outside sources 297 can include, but are not limited to, steam generation plants that generate steam via the combustion of one or more materials. For example, coal fired boilers, biomass fired boilers, petroleum coke fired boilers, and the like can be used to generate steam that can be introduced to the steam network 195 and/or directly to one or more various units of the system 200. In one or more embodiments, the outside source can provide electricity to the system 100. For example, the outside source can be or include one or more nuclear fission and/or nuclear fusion plants that can produce electricity that can be supplied to the system 200. Other suitable sources of electricity can include any electric power generation facility such as a wind turbine plant, conventional electric power generation plants that combust hydrocarbons to generate steam used in steam turbines, and the like.

Figure 8:
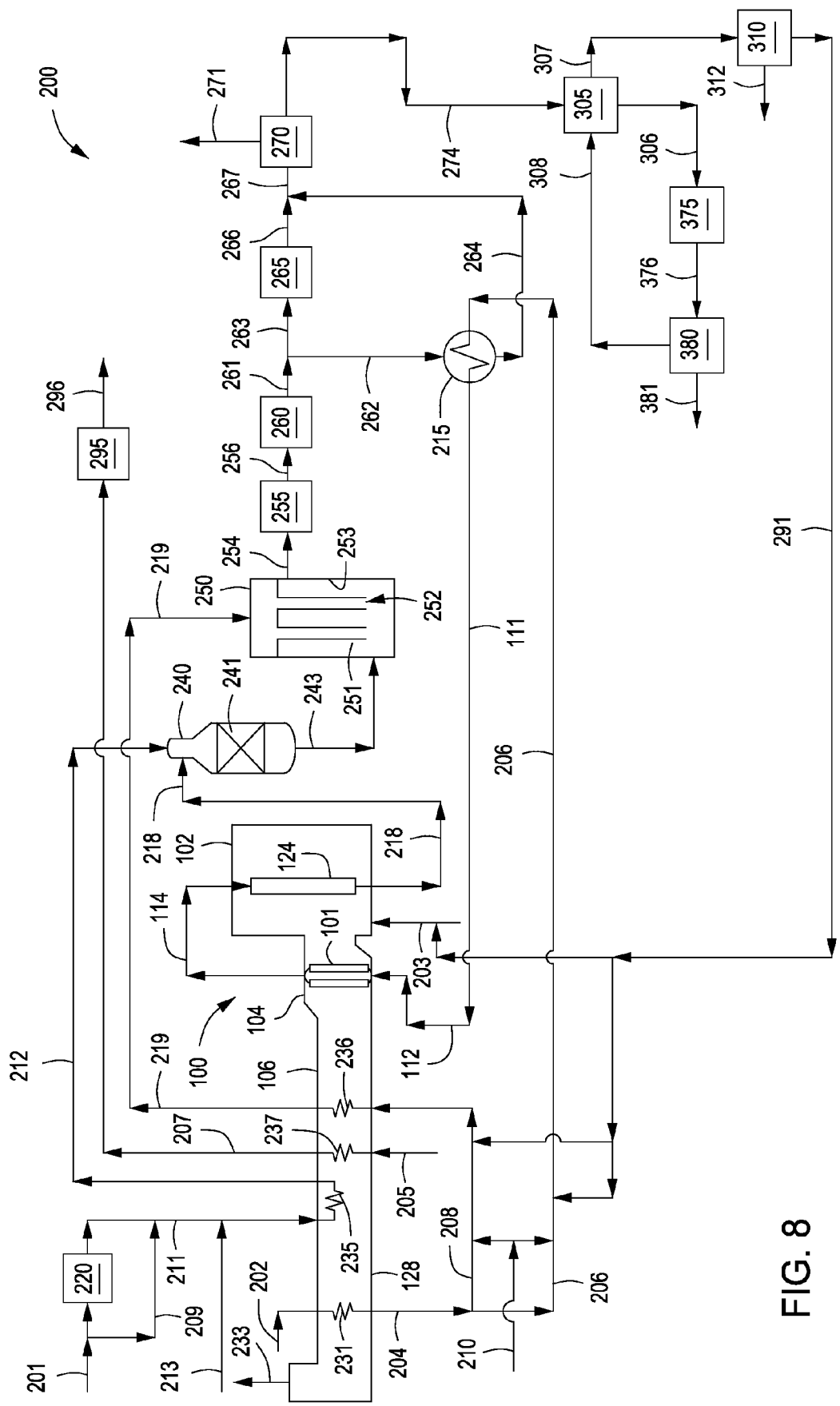
FIG. 8 depicts a schematic view of another illustrative system for reforming a hydrocarbon, according to one or more embodiments described.

FIG. 8 depicts another illustrative embodiment of the system 200 for producing syngas and ammonia therefrom. The system 200 can include the one or more reforming furnaces 100, ATRs 240, and third reformers 250, which can be as discussed and described above with reference to FIG. 7. The system 200 can also include the one or more heat exchangers 215, waste heat recovery ("WHR") units (two are shown 255, 265), shift converter systems 260, syngas purification systems 270, compressors 375, ammonia synthesis units 280, and steam networks 295, which can be as discussed and described above with reference to FIG. 2. The system 200 can further include one or more purifiers 305, which, as shown, can be disposed between and in fluid communication with the syngas purification system 270 and the compressor 375. In another example, the one or more purifiers 305 can be disposed between the compressor 375 and the ammonia synthesis unit 380. The system 200 can further include an argon and/or nitrogen removal system 310, which can be in fluid communication with a waste gas provided via line 307 from the purifier 305. In the system 200, the air absorption unit 220 in the system 200 discussed and described above with reference to FIG. 7, can be eliminated and air without oxygen enrichment via line 201 can be introduced to the ATR 240. The system 200 can include the air absorption unit 220, which can be as discussed and described above with reference to FIG. 7.

The first reformed hydrocarbon in line 218 can be as discussed and described above with reference to FIG. 7. However, introducing air via line 201 to the ATR 240, or heated air via line 212, which can be heated via the heating coil 235 disposed in the exhaust 128 of the reforming furnace 100, can provide a second reformed hydrocarbon via line 243 provided from the ATR 240 having different concentrations or amounts of components. For example, using air as the oxidant can increase the nitrogen concentration of the second reformed hydrocarbon provided via line 243 from the ATR 240.

The second reformed hydrocarbon in line 243 can have a hydrogen concentration ranging from a low of about 40 mol %, about 45 mol %, about 47 mol %, or about 49 mol % to a high of about 51 mol %, about 53 mol %, about 55 mol %, or about 60 mol %. The second reformed hydrocarbon in line 243 can have a carbon monoxide concentration ranging from a low of about 9 mol % or about 10 mol % to a high of about 11 mol % or about 12 mol %. The second reformed hydrocarbon in line 243 can have a carbon dioxide concentration ranging from a low of about 6 mol % or about 7 mol % to a high of about 8 mol %, or about 9 mol %. The second reformed hydrocarbon in line 243 can have a nitrogen concentration ranging from a low of about 28 mol %, about 29 mol %, or about 30 mol % to a high of about 33 mol %, about 34 mol %, or about 35 mol %. The second reformed hydrocarbon in line 243 can have a methane concentration of less than about 10 mol %, about 8 mol %, about 6 mol %, about 4 mol %, about 2 mol %, less than about 1.8 mol %, less than about 1.5 mol %, less than about 1 mol %, less than about 0.5 mol %, or less than about 0.3 mol %. For example, the methane concentration of the second reformed hydrocarbon in line 243 can range from about 0.5 mol % to about 1 mol % or from about 0.6 mol % to about 1.6 mol %. In at least one specific embodiment, the second reformed hydrocarbon in line 243 can have a hydrogen concentration of from about 47 mol % to about 53 mol %, a carbon monoxide concentration of from about 10 mol % to about 11 mol %, a carbon dioxide concentration of from about 7 mol % to about 9 mol %, a nitrogen concentration of about 29 mol % to about 32 mol %, and a methane concentration of less than about 1 mol %.

The second reformed hydrocarbon in line 243 can have a temperature ranging from a low of about 900° C., about 950° C., or about 1,000° C. to a high of about 1,050° C., about 1,075° C., or about 1,100° C. The pressure of the second reformed hydrocarbon in line 243 can range from a low of about 700 kPa, about 1,000 kPa, or about 1,400 kPa to a high of about 4,000 kPa, about 5,000 kPa, or about 6,000 kPa.

The second reformed hydrocarbon via line 243 can be introduced to the shell-side 253 of the third reformer 250 and mixed with the third reformed hydrocarbon within the shell-side 253 of the third reformer 250 to provide a mixed reformed hydrocarbon product or syngas product. As discussed and described above, the third reformed hydrocarbon and the second reformed hydrocarbon can remain separated, i.e., independent from one another. As discussed and described above, the third reformed hydrocarbon and the second reformed hydrocarbon can be mixed with one another outside the third reformer 250.

Heat required for endothermic reforming reactions within the catalyst-containing tubes 251 of the third reformer 250 can be provided from the second reformed hydrocarbon introduced via line 243. The second reformed hydrocarbon introduced via line 243, either alone or as a mixed reformed hydrocarbon, can flow along the outside of the one or more catalyst-containing tubes 251, thereby indirectly transferring heat from the second reformed hydrocarbon to the second hydrocarbon introduced via line 219 to the third reformer 250.

The syngas via line 254 can have a temperature ranging from a low of about 650° C., about 660° C., or about 670° C. to a high of about 775° C., about 800° C., or about 825° C. The syngas in line 254 can have a hydrogen concentration ranging from a low of about 45 mol % or about 47 mol % to a high of about 52 mol %, about 55 mol %, or about 60 mol %. The syngas in line 254 can have a carbon monoxide concentration ranging from a low of about 9 mol % or about 10 mol % to a high of about 11 mol % or about 12 mol %. The syngas in line 254 can have a carbon dioxide concentration ranging from a low of about 5 mol % or about 6 mol % to a high of about 8 mol % or about 10 mol %. The syngas in line 254 can have a nitrogen concentration ranging from a low of about 28 mol % or about 29 mol % to a high of about 31 mol % or about 32 mol %. The syngas in line 254 can have a methane concentration of less than about 10 mol %, less than about 8 mol %, less than about 5 mol %, less than about 3 mol %, less than about 2 mol %, less than about 1 mol %, or less than about 0.5 mol %. For example, the methane concentration of the syngas in line 254 can range from about 0.3 mol % to about 2 mol %.

The syngas via line 254 can be introduced to the first WHR unit 255 to provide a cooled syngas via line 256. The cooled syngas via line 256 can be introduced to the shift converter 260 to provide a shift converted syngas via line 261. In at least one specific embodiment, at least a portion of the shift converted syngas in line 261 can be introduced via line 262 to the heat exchanger 215 to provide a cooled syngas via line 264 and a heated first hydrocarbon via line 111. At least a portion of the shift converted syngas via line 263 can be introduced to the WHR unit 265 to provide a cooled syngas via line 266. The cooled syngas in line 266 and/or the cooled syngas in line 264 can be introduced via line 267 to the syngas purification system 270. The syngas purification unit 170 can remove carbon dioxide and/or water via line 271, as discussed and described above with reference to FIG. 7. A syngas via line 274, as discussed and described above with reference to FIG. 7, can also be recovered from the syngas purification unit 270. However, the syngas in line 274 can have different concentrations of components therein than the syngas in line 274 described above with reference to FIG. 7. For example, using air as the oxidant can increase the nitrogen concentration in the syngas in line 274. The syngas in line 274 thus can have a hydrogen concentration ranging from a low of about 55 mol %, about 57 mol %, or about 59 mol % to a high of about 61 mol %, about 63 mol %, or about 65 mol %. The syngas in line 274 can have a nitrogen concentration ranging from a low of about 35 mol % or about 37 mol % to a high of about 38 mol % or about 40 mol %. The syngas in line 274 can have a methane concentration of less than about 4 mol %, less than about 3 mol %, less than about 2 mol %, less than about 1 mol %, or less than about 0.9 mol %. The syngas in line 274 can have an argon concentration ranging from a low of about 0.1 mol %, about 0.5 mol %, or about 0.75 mol % to a high of about 1 mol %, about 1.5 mol %, or about 2 mol %. The hydrogen to nitrogen ($H_2:N_2$) molar ratio can range from about 1.5:1 to about 2.2:1 or from about 1.6:1 to about 1.75:1.

The syngas via line 274 can be introduced to the purifier 305 to provide a purified syngas via line 306 and a waste gas via line 307. The purifier 305 can remove one or more contaminants, such as excess nitrogen, argon, oxygen, and methane to provide a contaminant-lean syngas mixture or purified syngas via line 306. The purifier 305 can be used to remove or separate at least a portion of any contaminants, including excess nitrogen, i.e., nitrogen in excess of that necessary to provide a $H_2:N_2$ molar ratio of from about 2.2:1 to about 3:1, from the syngas introduced via line 274. The purifier 305 can include one or more cryogenic-type separators operating at a temperature less than −175° C. The one or more contaminants and/or excess nitrogen can be removed from the purifier 205 as the waste gas via line 207.

The $H_2:N_2$ molar ratio of the purified syngas in line 306 can range from about 2:1 to about 4:1, or from about 2.2:1 to about 3.2:1. For example, the $H_2:N_2$ molar ratio can be about 2.9:1, about 3:1, about 3.1:1, or about 3.2:1. The hydrogen concentration in the purified syngas in line 306 can range from a low of about 70 mol %, about 72 mol % or about 74 mol % to a high of about 76 mol %, about 78 mol %, or about 80 mol %. The nitrogen concentration in the purified syngas in line 306 can range from a low of about 22 mol % or about 24 mol % to a high of about 26 mol % or about 28 mol %. The methane concentration in the purified syngas in line 206 can range from less than about 1 ppm up to about 1,000 ppm. The argon concentration in the purified syngas in line 206 can range from about 0.1 mol % to about 0.5 mol % or from about 0.3 mol % to about 0.4 mol %.

The purified syngas via line 306 can be introduced to the one or more compressors 375 to provide a compressed purified syngas via line 376. The compressed syngas via line 376 can be introduced to and the ammonia synthesis unit 380 to provide an ammonia product via line 381 and a purge gas via line 308, as discussed and described above with reference to FIG. 7. However, the purge gas provided via line 308 from the ammonia synthesis unit 380 can have a different composition than the purge gas provided via line 282 from the ammonia synthesis unit 280, as discussed and described above with reference to FIG. 7. The purge gas in line 308 can be recycled to the purifier 305 for hydrogen recovery.

The purge gas via line 308 provided from the ammonia synthesis unit 380 can be introduced to the purifier 305 directly or to the syngas in line 274. The purifier 305 can separate excess components, such as nitrogen, argon, oxygen, methane, or others from the purge gas introduced via line 308, which can be recovered or rejected via line 307 as the waste gas provided from the purifier 305. For example, a purge gas having composition containing about 10 mol % methane, about 8 mol % hydrogen, about 80 mol % nitrogen, and about 2 mol % argon can be separated to provide a purge gas via line 312 having a composition containing about 20 mol % methane, about 25 mol % hydrogen, about 53 mol % nitrogen, and about 2 mol % argon and a vent gas via line 212 containing the removed nitrogen and argon.

The purge gas via line 312 can be recycled to the first hydrocarbon in line 206, the second hydrocarbon in line 208, the low-grade fuel in line 203, or any other process, similar to the purge gas via line 312, similar to the purge gas in line 291 discussed and described above with reference to FIG. 1.

The syngas produced via line 254 from the reforming furnace 100, the ATR 240, and the third reformer 250, as discussed and described above with reference to FIGS. 7 and 8, can be used in other processes as a fuel and/or a feed for producing one or more other products. Illustrative processes for which the hydrocarbon in line 254 can be used for can be similar to the processes discussed and described in U.S. Patent Application Publication Nos.: 2009/0064582 and 2008/0275143, which are incorporated by reference herein in its entirety, to the extent not inconsistent with this disclosure.

The system 200 can be built as a new or grass-roots facility. In other words, the system 200 can be built from the ground up. The system 200 can be provided by modifying, retrofitting, or revamping an existing syngas production system. For example, the system 200 can be provided by revamping an existing integrated syngas and ammonia production system. An existing syngas production system that includes a traditional SMR and a secondary ATR reformer can be revamped to include the reforming furnace 100, the ATR 240, and the third reformer 250, discussed and described above with reference to FIGS. 7 and 8. Traditional SMRs require high-grade fuel, for example, hydrocarbons similar to or the same as those used as the hydrocarbon feed in line 202. Traditional SMRs require a large amount of high-quality or high-grade fuel, such as natural gas, that is combusted within the SMR to provide the heat necessary for the reforming reactions to occur within the one or more reforming tubes 124. However, revamping a traditional SMR or providing a new facility with the reforming furnace 100 reduces the need for the high-quality fuel to be used as a source of heat within the SMR, thereby allowing more of the high-quality hydrocarbon in line 202 to be converted to syngas via lines 254, as discussed and described above with reference to FIGS. 7 and 8.

A revamped existing facility or a new facility that includes the reforming furnace 100, the ATR 240, and the third reformer 250 can increase the syngas production via lines 254 by about 20% to about 50%. Any syngas production system can be revamped to include the reforming furnace 100, the ATR 240, and the third reformer 250, as discussed and described above with reference to FIGS. 7 and 8. For example, an existing SMR and ATR syngas production system that produces hydrogen, Fischer-Tropsch products, methanol, ammonia, urea, or the like, can be revamped to provide the reforming furnace 100, the ATR 240, and the third reformer 250.

EXAMPLES

Embodiments of the present invention can be further described with the following simulated examples. The following two simulated process results shown in Table 1 illustrate (1) a standard process using a traditional SMR and (2) the standard process modified to operate according to the present invention, using an embodiment of the reforming furnace 100, according to one or more embodiments described above with reference to FIGS. 1, 7, and 8.

TABLE

| Reference Numeral | Design Feature | Conventional Primary Reformer | Reforming Furnace 100 |
|---|---|---|---|
| 111 | Preheated Feed Stream Temperature, ° C. | 460 to 621 | 375 to 440 |
| 218 | Outlet Reformed Gas Temperature, ° C. | 690-860 | 590 to 640 |
| 218 | Hydrogen content (dry basis, mol. %) | 55 to 70 | 40 to 45 |
| 218 | Methane content (dry basis, mol. %) | 12 to 15 | 35 to 45 |
| 102 | Radiant heat duty MMBtu/hr for a 1,500 t/d ammonia plant | 350 to 425 | 90 to 120 |
| 124 | Reformer tube average tube metal temperature, ° C. | 780 to 900 | 600 to 700 |
| 102 | Radiant Tube Heat Flux BTU/ft²/hr | 20,000 to 28,000 | 6000 to 15,000 |
| 100 | Percent of heat utilized for direct reforming reaction | 43 to 48 | 55 to 65 |

TABLE-continued

| Reference Numeral | Design Feature | Conventional Primary Reformer | Reforming Furnace 100 |
|---|---|---|---|
| 109a | Temperature of flue gas exiting radiant section 102, ° C. | 1010 to 1065 | 590 to 700 |

A syngas and/or ammonia plant can consume energy in several ways, which can primarily include (a) the process hydrocarbon in line 202, (b) the fuel energy required for generating/supplementing steam generation for a steam network (not shown), (c) fuel energy for the reforming furnace 100 via the fuel in line 203, and (d) fuel energy for generating oxygen for air enrichment or from compressing air in lines 201, 211.

As shown in the table, existing SMRs typically operate at high temperatures in an effort to elevate the average tube metal temperature of the reformer tubes 124 to drive the endothermic reforming reaction. As a byproduct of this, the flue gas exiting the radiant section 102, is thus very hot and makes efficiently recovering the heat therefrom difficult without using exotic and expensive materials in the heat recovery structures. In the reforming furnace 100, however, the heat is reduced, as the required processing duty is decreased by the inclusion of the additional reformers 240, 250. This allows the extended surfaces 116A, 116B (FIGS. 2 and 3, respectively) to be included, driving up efficiency and recovering some of the processing duty capacity lost by reducing the firing duty of the burners in the radiant section 102.

A revamped existing facility or a new facility that includes reforming furnace 100, the second reformer 240, and the third reformer 250 can increase the syngas production via line 254 from about 20% to about 50%. The dependency of a syngas and/or ammonia plant's production capacity on the supply of natural gas or other high grade fuel can also be reduced by 20% to 50%. The process becomes flexible in the use of a particular type of energy source for generating energy required to operate the processes. Acceptable fuel sources for generating the required energy for the process is increased to a number of potential fuel sources, such as off-gases, coal, or the like.

As shown in the Table, the first reformed hydrocarbon via line 218 from the reforming furnace 100 can be at a temperature of about 590° C. to about 640° C., which is substantially less than a traditional SMR reformed effluent. The radiant heat duty required for reforming the first hydrocarbon to provide the first reformed hydrocarbon in line 218 can be reduced from 350 to 425 MMBtu/hr to about 90 to 120 MMBtu/hr for an ammonia plant producing about 1,500 t/d ammonia. The percent of heat generated in the reforming furnace 100 that can be utilized for reforming the first hydrocarbon introduced via line 111 to provide the first reformed hydrocarbon via line 218 can increase from 43-48% to 55-65%. As such, the flue gas temperature in the radiant section 102 can be reduced, at a minimum or no reduction to throughput. This can allow the temperature of the flue gas produced as a byproduct in the radiant section 102 to be reduced, thereby reducing the temperature of the flue gas in the transition section 104 to a range of from about 590° C. to about 700° C., which is significantly less than in conventional devices (as shown in Table 1, of from 1010° C. to 1065° C.). This reduction can allow for efficiency-enhancing geometries, such as extended surfaces 116A and/or 116B, to be included on the pre-reformer tubes 101, which would previously have yielded in the higher-temperature flue gas.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. When molar or volume percentage contents of a particular line or stream are described, it is assumed that the sum of all such percentages of all materials present in any particular line or stream is equal to 100% (molar or volume, as appropriate to the context).

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to certain embodiments of the present invention, other and further embodiments of the invention may be devised without departing from the basic scope thereof, and the scope thereof is determined by the claims that follow.

What is claimed is:

1. An apparatus for reforming a hydrocarbon to produce syngas, comprising:
   a first reformer comprising:
      a radiant section having a reformer tube disposed therein, wherein the reformer tube is at least partially filled with a first catalyst;
      a transition section coupled to the radiant section to receive a flue gas therefrom;
      a convective section coupled to the transition section to receive the flue gas therefrom; and
      a plurality of pre-reformer tubes disposed in the transition section, at least partially filled with a second catalyst, and fluidly coupled to the reformer tube via a line external to the plurality of pre-reformer tubes, wherein at least one of the plurality of pre-reformer tubes has at least one extended surface disposed thereon;
   a second reformer coupled to both the reformer tube and an oxidant source, wherein the second reformer comprises a burner in fluid communication with one or more catalyst beds disposed therein; and
   a third reformer coupled to the second reformer.

2. The apparatus of claim 1, wherein the extended surface comprises fins, each fin extending longitudinally or circumferentially.

3. The apparatus of claim 1, wherein the extended surface comprises rows of studs.

4. The apparatus of claim 1, wherein the extended surface is formed from stainless steel, HK-40, HP Mod, HP Mod MA, combinations thereof, or alloys thereof.

5. The apparatus of claim 4, wherein the flue gas has a temperature of from about 530° C. to about 710° C. when the flue gas is received by the transition section.

6. The apparatus of claim 1, wherein:
   the radiant section is coupled to the transition section via a radiant exhaust, the radiant exhaust being disposed on a side of the radiant section, proximal a bottom thereof; and the plurality of pre-reformer tubes are oriented in the transition section transversely to the flow of the flue gas therein and are laterally offset from the reformer tube.

7. The apparatus of claim 1, wherein the transition section is adapted to receive a flue gas having a mass flow rate from about 350,000 lbs/hr to about 500,000 lbs/hr.

8. The apparatus of claim 1, wherein the transition section is retrofitted to the radiant section.

9. The apparatus of claim 1, wherein the first reformer is adapted to receive a first portion of the hydrocarbon and the third reformer is adapted to receive a second portion of the hydrocarbon.

10. The apparatus of claim 9, wherein the second reformer is adapted to receive a reformed hydrocarbon from the first reformer and is adapted to provide a first syngas to the third reformer.

11. The apparatus of claim 10, wherein the first reformer is a steam methane reformer, the second reformer is an autothermal reformer, and the third reformer is a shell-and-tube reformer.

12. A system for reforming a hydrocarbon, comprising:
a steam methane reformer comprising:
an inlet receiving the hydrocarbon;
a radiant section having a reformer tube disposed therein and configured to radiantly heat the reformer tube to an average tube metal temperature of from about 590° C. to about 710° C. and to generate a flue gas having a temperature of from about 535° C. to about 710° C.;
a transition section coupled to the radiant section such that the transition section receives and cools the flue gas, the transition section including a plurality of pre-reformer tubes coupled to the inlet and to the reformer tube, at least one of the plurality of pre-reformer tubes having one or more extended surfaces extending radially therefrom; and
a convection section coupled to the transition section and including one or more convective elements, wherein the convection section is configured to receive the flue gas from the transition section, and the convective elements are configured to further cool the flue gas;
an autothermal reformer having a burner in fluid communication with one or more catalyst beds disposed therein, a first inlet coupled to the reformer tube of the steam-methane reformer, a second inlet for receiving an oxidant, and an outlet; and
a shell-and-tube reformer having a first inlet coupled to the outlet of the autothermal reformer, and a second inlet receiving a second portion of the hydrocarbon.

13. The apparatus of claim 1, wherein the third reformer is external to the first reformer and external to the second reformer, and wherein the third reformer comprises one or more catalyst containing tubes.

14. The apparatus of claim 1, wherein the transition section is disposed between the radiant section and the convective section.

15. The apparatus of claim 1, wherein the radiant section has a greater cross-sectional area than the transition section.

16. The apparatus of claim 1, wherein the transition section has a greater cross-sectional area than the convective section.

17. The system of claim 12, wherein the shell-and-tube reformer is external to the steam methane reformer and external to the autothermal reformer and comprises one or more catalyst containing tubes.

18. The system of claim 12, wherein the radiant section has a greater cross-sectional area than the transition section and the transition section has a greater cross-sectional area than the convective section.

19. A system for reforming a hydrocarbon, comprising:
a steam methane reformer comprising:
an inlet receiving the hydrocarbon;
a radiant section having a reformer tube disposed therein and configured to radiantly heat the reformer tube to an average tube metal temperature of from about 590° C. to about 710° C. and to generate a flue gas having a temperature of from about 535° C. to about 710° C.;
a transition section coupled to the radiant section such that the transition section receives and cools the flue gas, the transition section containing a plurality of pre-reformer tubes coupled to the inlet and to the reformer tube, at least one of the plurality of pre-reformer tubes having one or more extended surfaces extending radially therefrom; and
a convection section coupled to the transition section and including one or more convective elements, wherein the convection section is configured to receive the flue gas from the transition section, and the convective elements are configured to further cool the flue gas;
an autothermal reformer comprising a first inlet coupled to the reformer tube of the steam-methane reformer, a second inlet coupled to a first conduit at least partially disposed in the convective section, and an outlet and wherein the autothermal reformer comprises a burner in fluid communication with one or more catalyst beds disposed therein;
a shell-and-tube reformer having a first inlet coupled to the outlet of the autothermal reformer, a second inlet coupled to a second conduit at least partially disposed in the convective section, and an outlet; and
an ammonia synthesis unit having an inlet in fluid communication with the outlet of the shell-and-tube reformer and an outlet in fluid communication with an internal volume of the radiant section.

20. The system of claim 18, wherein the radiant section has a greater cross-sectional area than the transition section and the transition section has a greater cross-sectional area than the convective section.

\* \* \* \* \*